United States Patent
Zhao et al.

(10) Patent No.: US 11,694,396 B1
(45) Date of Patent: Jul. 4, 2023

(54) METHODS AND APPARATUSES FOR CLEANING POOL

(71) Applicant: COCLEAN Technologies, Co., Ltd., Suzhou (CN)

(72) Inventors: Fei Zhao, Suzhou (CN); Ye Zhao, Suzhou (CN)

(73) Assignee: COCLEAN Technologies, Co., Ltd., Suzhou (CN)

( * ) Notice: Subject to any disclaimer, the term of this patent is extended or adjusted under 35 U.S.C. 154(b) by 0 days.

(21) Appl. No.: 18/070,409

(22) Filed: Nov. 28, 2022

(30) Foreign Application Priority Data

Jun. 13, 2022 (CN) .......................... 202210667100.4

(51) Int. Cl.
*G06T 17/00* (2006.01)
*E04H 4/16* (2006.01)

(52) U.S. Cl.
CPC .......... *G06T 17/00* (2013.01); *E04H 4/1654* (2013.01)

(58) Field of Classification Search
None
See application file for complete search history.

(56) References Cited

U.S. PATENT DOCUMENTS

| | | | |
|---|---|---|---|
| 2017/0212523 A1* | 7/2017 | Witelson | G05D 1/0274 |
| 2019/0101394 A1 | 4/2019 | Van Der Meijden et al. | |
| 2020/0056890 A1 | 2/2020 | Newman et al. | |
| 2021/0124366 A1* | 4/2021 | Durvasula | H04N 23/66 |

FOREIGN PATENT DOCUMENTS

CN 105308414 B 7/2018

* cited by examiner

*Primary Examiner* — Peter Hoang
(74) *Attorney, Agent, or Firm* — The Small Patent Law Group LLC; Christopher R. Carroll

(57) ABSTRACT

A method and an apparatus for cleaning a pool are provided, being applied to a client application installed in a terminal device. The method includes: modeling the pool according to information of the pool collected by the terminal device to determine a three-dimensional model of the pool; receiving a cleaning result on the pool sent by an unmanned cleaning device coupled with the terminal device, and displaying the cleaning result in the client application, wherein a cleaning route of the unmanned cleaning device is determined by the terminal device according to the three-dimensional model; and receiving feedback on the cleaning result, and adjusting a path planning of the unmanned cleaning device based on the feedback.

19 Claims, 13 Drawing Sheets

METHODS AND APPARATUSES FOR CLEANING POOL

CROSS REFERENCE TO RELATED APPLICATIONS

The present application claims priority to Chinese Patent Application No. 202210667100.4 filed on Jun. 13, 2022, the entire content of which is incorporated herein by reference.

TECHNICAL FIELD

The present disclosure relates to the field of pool cleaning and more particularly to a method and an apparatus for cleaning a pool.

BACKGROUND

Along with development of internet of things industry, people can enjoy many changes brought to their lives by machines. For example, sweeping robots and mopping robots allow people not to clean ground frequently, and intelligent household controllers and intelligent door locks can run based on operations of people on intelligent terminals.

Accordingly, in the field of pool cleaning, there are some cleaning robots capable of assisting people in cleaning pools. But, due to different sizes and shapes of pools, the cleaning robots require people to measure parameters of the pools using a laser range finder.

SUMMARY

The present disclosure provides a method of cleaning a pool, being applied to a client application installed in a terminal device. The method includes: modeling the pool according to information of the pool collected by the terminal device to determine a three-dimensional model of the pool; receiving a cleaning result on the pool sent by an unmanned cleaning device coupled with the terminal device, and displaying the cleaning result in the client application, wherein a cleaning path of the unmanned cleaning device is determined by the terminal device according to the three-dimensional model; receiving feedback on the cleaning result, and adjusting a path planning of the unmanned cleaning device based on the feedback.

The present disclosure provides an apparatus for cleaning a pool, being applied to a client application installed in a terminal device. The apparatus includes: a collecting module, configured to, in response to receiving a startup instruction for the client application, display guidance information on a display screen of the terminal device, where the guidance information is configured to guide a user to collect environmental data of the pool by using the terminal device based on specified poses, and the environmental data includes images of the pool and laser point cloud data respectively corresponding to the images; a modeling module, configured to, based on the images and the laser point cloud data respectively corresponding to the images, determine a three-dimensional model of the pool; a cleaning module, configured to, based on the three-dimensional model, determine a cleaning path of an unmanned cleaning device coupled to the terminal device, and send the cleaning path to the unmanned cleaning device to instruct the unmanned cleaning device to clean the pool according to the cleaning path.

The present disclosure provides a non-transitory computer readable storage medium, storing a computer program, where the computer program is executed by a processor to perform the above-mentioned method of cleaning a pool.

The present disclosure provides an electronic device, including a memory, a processor and a computer program stored on the memory and run on the processor. The processor executes the program to perform the above-mentioned method of cleaning a pool.

The present disclosure can achieve the following beneficial effects by adopting at least one of the above technical solutions.

In the method of cleaning a pool according to the present disclosure, the terminal device can, in response to receiving a startup instruction for the client application installed in the terminal device, display guidance information on a display screen of the terminal device, guide a user to collect the environmental data, including the images of the pool and the laser point cloud data respectively corresponding to the images, by using the terminal device based on specified poses, determine a three-dimensional model of the pool based on the images and the laser point cloud data respectively corresponding to the images, determine a cleaning path of an unmanned cleaning device coupled to the terminal device based on the three-dimensional model, and send the cleaning path to the unmanned cleaning device to instruct the unmanned cleaning device to clean the pool according to the cleaning path.

From the above method, it can be seen that collecting of various data of the pool and planning of the cleaning path can be achieved by using the terminal device of a user based on simple steps, thus increasing the cleaning efficiency and lowering the cleaning costs at the same time.

BRIEF DESCRIPTION OF THE DRAWINGS

The accompanying drawings are used as a part of the specification to provide further understanding for the present disclosure. The illustrative embodiments and relevant descriptions of the present disclosure are used to explain the present disclosure rather than constitute any limitation to the present disclosure.

DETAILED DESCRIPTION OF THE EMBODIMENTS

In order to make the objects, technical solutions and advantages of the embodiments of the present disclosure clearer, the technical solutions of the present disclosure will be fully and clearly described below in combination with the accompanying drawings and the embodiments of the present disclosure. Apparently, the embodiments described herein are merely some embodiments of the present disclosure rather than all embodiments. Other embodiments obtained by those skilled in the art based on these embodiments without making creative work shall all fall within the scope of protection of the present disclosure.

In pool cleaning field, before a cleaning robot is configured to assist people in cleaning a pool, people are required to use a laser range finder to measure parameters of the pool to obtain sizes and shapes of different pools. But, use of such laser range finders will bring tedious procedures to a user during pool cleaning process, resulting in low cleaning efficiency and high cleaning costs.

In combination with accompanying drawings, the technical solutions of the embodiments of the present disclosure will be detailed below.

Figure 1:
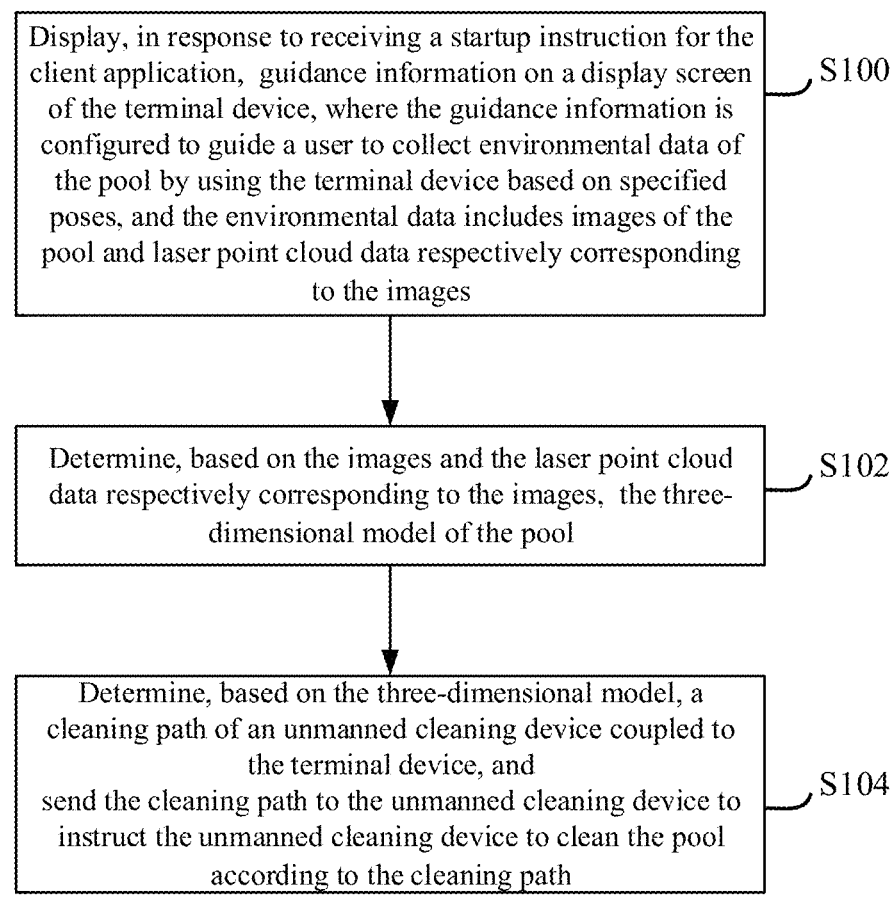
FIG. 1 is a flowchart illustrating a method of cleaning a pool according to one or more embodiments of the present disclosure.

FIG. 1 is a flowchart illustrating a method of cleaning a pool according to the present disclosure. The method is applied to a client application installed in a terminal device and includes the steps S100 to S104.

At step S100, in response to receiving a startup instruction for the client application, guidance information is displayed on a display screen of the terminal device, where the guidance information is configured to guide a user to collect environmental data of the pool by using the terminal device based on specified poses, and the environmental data includes images of the pool and laser point cloud data respectively corresponding to the images.

In one or more embodiments of the present disclosure, due to different shapes and sizes of pools, it is required to collect various data of the pool before cleaning the pool, so as to plan a cleaning path suitable for the pool. In this case, an unmanned cleaning device for cleaning the pool can clean the pool according to the planned cleaning path.

Since it is required to collect environmental data of the pool, the method can be performed by a terminal device capable of collecting images and laser point cloud data in the present disclosure. The terminal device can be a smart phone, a tablet computer and the like, or a terminal system formed by a smart phone and tablet computer and the like together with a server. The form of the terminal device is not limited in the present disclosure and can be set based on actual needs. The method executed by the terminal device is generally executed by the client application running on the terminal device, and thus, descriptions of the present disclosure are made with the client application performing the method.

In one or more embodiments of the present disclosure, because a swimming pool is also a pool, the method can be applied to cleaning a swimming pool. For household swimming pools, they are generally disposed as several types due to factors such as aesthetics and costs although they have different shapes, sizes and materials. Therefore, for the purpose of ease of use and higher cleaning efficiency, a plurality of pool types and environmental data collection poses respectively corresponding to various pool shapes are preset in the client application for performing the method.

Before cleaning a swimming pool, the user can firstly open the terminal device and then start the client application installed in the terminal device. After the client application is started, a preset pool shape selection interface is displayed. The pool shape selection interface is configured to prompt the user to select a type of a pool to be cleaned.

In response to receiving an input from pool shape selection interface, the client application determines the type of the pool to be cleaned in the input as a target pool shape. Then, based on the determined target pool shape, a plurality of collection poses for the client application collecting the environmental data of the pool corresponding to the target pool shape are determined as the specified poses, and based on the determined specified poses, the guidance information is determined.

Figure 14:
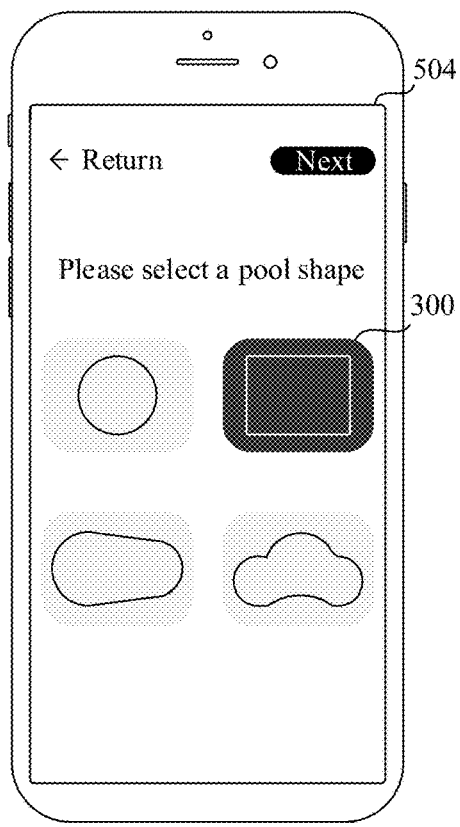
FIG. 14 is a schematic diagram of a pool shape selection interface according to one or more embodiments of the present disclosure.

The present disclosure further provides a schematic diagram illustrating a pool shape selection interface. As shown in FIG. 14, the client application 504 displays a preset pool shape selection interface and in response to receiving an input from the pool shape selection interface, determines the square pool 300 being selected and highlights the square pool 300.

Each collection pose includes a position of a data collecting module and an orientation of the data collecting module at the time of collecting the environmental data. Regions of the environmental data collected based on respective collection poses cover an entire region of the pool. The data collecting module can be a data collecting module in the terminal device running the client application, and include a camera and a laser radar and the like. The data collecting module can also be an apparatus or module specially used to collect the environmental data. The form of the data collecting module can be set based on actual needs and thus will not be limited herein. The guidance information is configured to guide the user to collect the environmental data by using the client application based on the specified poses.

Figure 2:
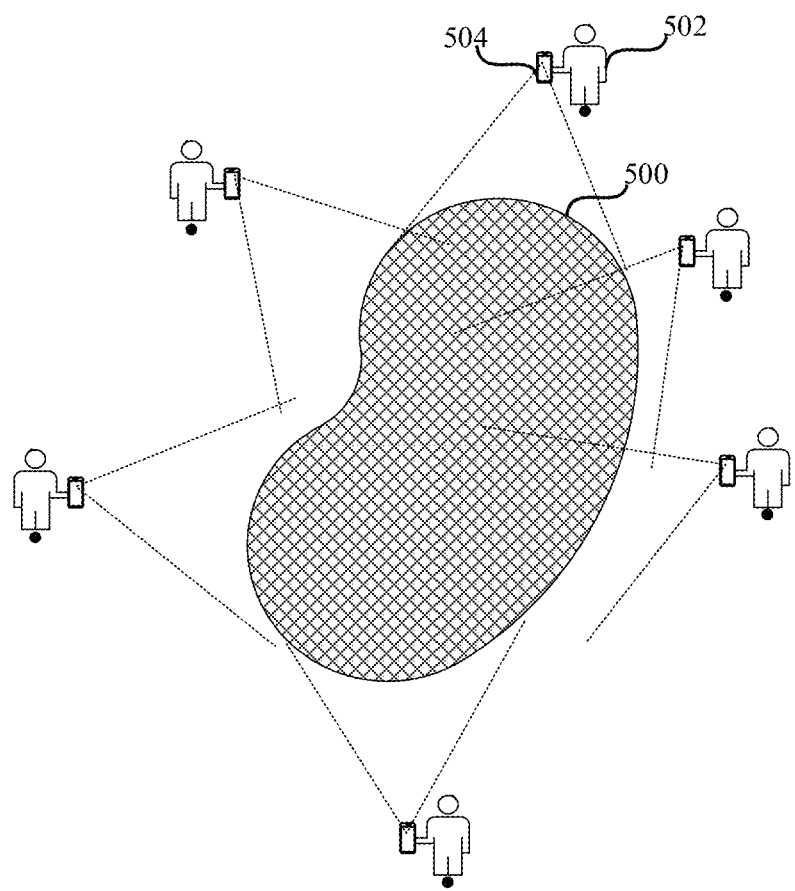
FIG. 2 is a schematic diagram illustrating collection poses according to one or more embodiments of the present disclosure.

The present disclosure provides a schematic diagram illustrating collection poses. As shown in FIG. 2, the user 502 can collect the environmental data of the pool 500 by using the client application 504 running on the terminal device. For example, the client application 504 collects the environmental data of the pool 500 by invoking the camera and the laser radar in the terminal device. The pool 500 is a pool of irregular shape, where line segments filled in the pool 500 represent pool water. The user can go to six collection points around the pool 500 respectively to collect the environmental data, where the six collection points are represented by six solid dots. Further, a collection orientation is represented by two dotted lines around each collection point.

Figure 3:
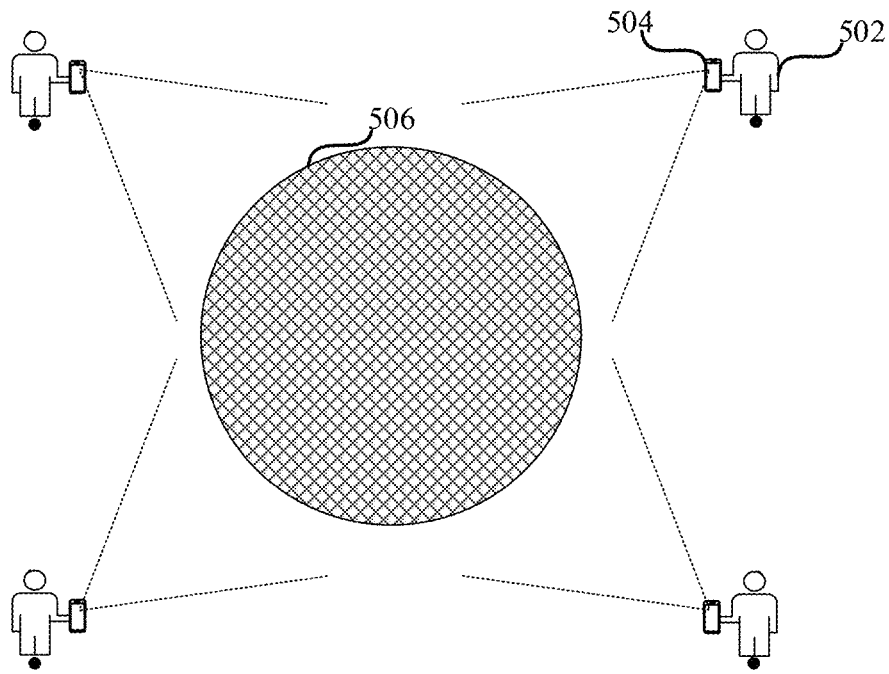
FIG. 3 is a schematic diagram illustrating collection poses according to one or more embodiments of the present disclosure.

The present disclosure further provides a schematic diagram illustrating collection poses. As shown in FIG. 3, the user 502 can collect the environmental data of the pool 506 by using the client application 504 running on the terminal device. For example, the client application 504 collects the environmental data of the pool 506 by invoking the camera and the laser radar in the terminal device. The pool 506 is a circular pool, where line segments filled in the pool 506 represent pool water. The user can go to four collection points around the pool 506 respectively to collect the environmental data, where the four collection points are represented by four solid dots. Further, a collection orientation is represented by two dotted lines around each collection point.

Figure 4:
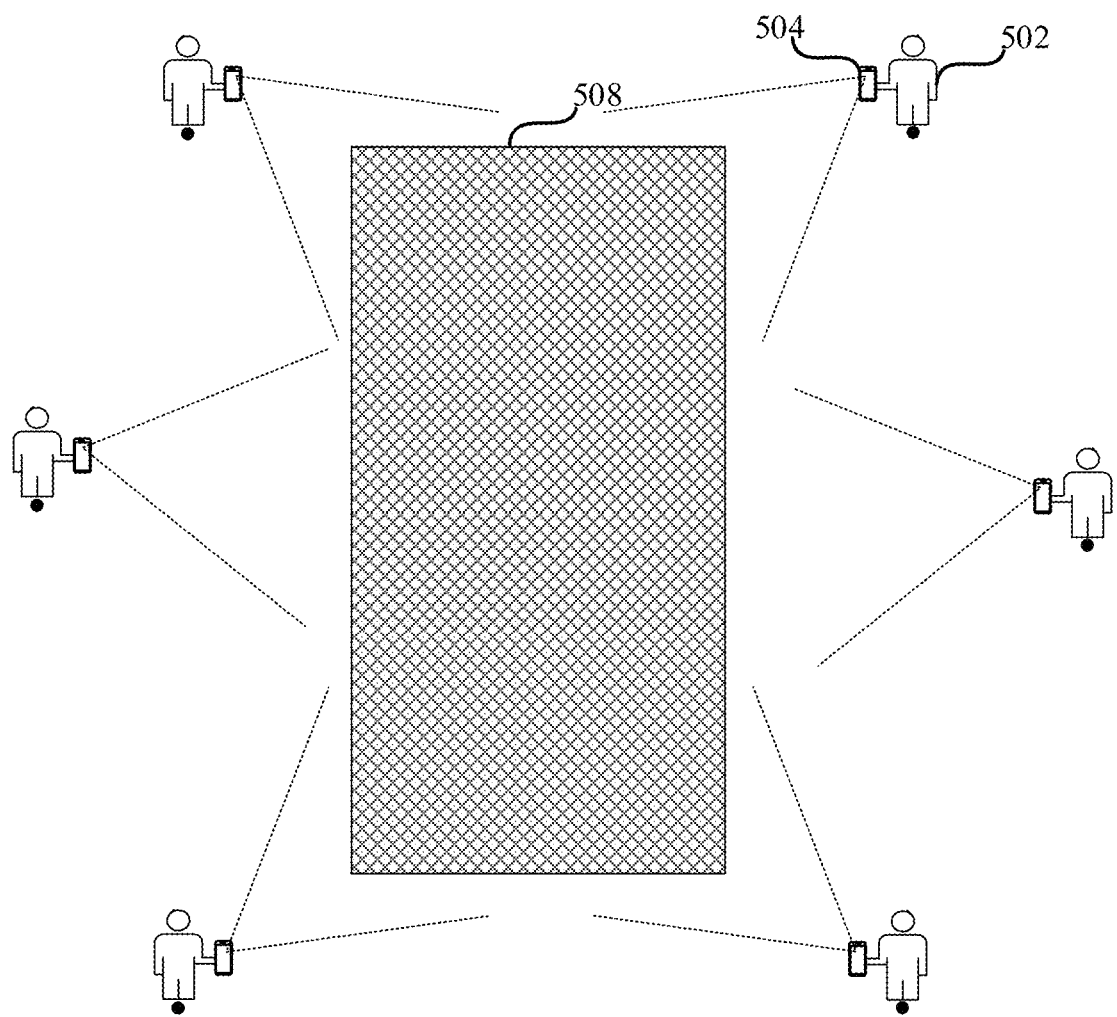
FIG. 4 is a schematic diagram illustrating collection poses according to one or more embodiments of the present disclosure.

The present disclosure further provides a schematic diagram illustrating collection poses. As shown in FIG. 4, the user 502 can collect the environmental data of the pool 508 by using the client application 504 running on the terminal device. For example, the client application 504 collects the environmental data of the pool 508 by invoking the camera and the laser radar in the terminal device. The pool 508 is a rectangular pool, where line segments filled in the pool 508 represent pool water. The user can go to six collection points around the pool 508 respectively to collect the environmental data, where the six collection points are represented by six solid dots. Further, a collection orientation is represented by two dotted lines around each collection point.

In some embodiments, in order to shorten a time used by the user for collecting respective groups of environmental data and increase the cleaning efficiency, it can be determined that a number of groups of environmental data to be collected in the guidance information is not greater than a preset threshold, where the preset threshold can be set, for example, to five, six and seven. For example, if the selected pool is circular, the terminal device can determine a minimum number of groups of environmental data to be collected to cover the entire region of the pool based on the parameters of the camera and the laser radar, the shape of the selected pool, and the characteristic information of the pool. For example, for the circular pool, at least four groups of environmental data need to be collected to cover the entire region of the circular pool. In this case, after the input of pool shape selection is received, the display screen of the terminal device displays: the number of groups of environmental data to be collected, for example, the number can be four, five, six and seven for selection by the user. If the user selects "four", the guidance information includes four specified poses. In some embodiments, based on the selected pool shape, an information collection interface is displayed on the display screen of the terminal device, and in response to receiving an input from the information collection interface, the characteristic information of the pool is determined. The characteristic information includes one or more of a pool depth and a pool size.

After the guidance information is determined, the guidance information can be displayed on the display screen of the terminal device to guide the user to collect respective groups of environmental data of the pool by using the client application based on the specified poses in the guidance information. Moreover, in order to build a three-dimensional model of the pool based on these groups of environmental data in subsequent steps, these groups of environmental data need to include images of the pool and a distance between the terminal device running the client application and each point in the images at the time of collecting the images by the client application. Therefore, these groups of environmental data include the images and laser point cloud data corresponding to the images. The laser point cloud data can be collected by a laser radar, a millimeter wave radar or an infrared ranging sensor or the like in the terminal device.

By applying the above-mentioned method, the user can be guided to collect accurate and effective data of the pool, such that the client application can build the three-dimensional model of the pool, so as to plan a path for cleaning the pool.

It is to be noted that in one or more embodiments of the present disclosure, the pool 500 corresponds to the pool of irregular shape in FIG. 2, the pool 506 corresponds to the circular pool in FIG. 3 and the pool 508 corresponds to the rectangular pool in FIG. 4.

At step S102, based on the images and the laser point cloud data respectively corresponding to the images, the three-dimensional model of the pool is determined.

In one or more embodiments of the present disclosure, in order to more accurately plan a path for cleaning the pool, and avoid the cases of missed regions and repeated cleaning of a particular region and the like during a process of cleaning the pool, the client application can build the three-dimensional model of the pool based on respective groups of collected environmental data.

In some embodiments, firstly, the client application can, in response to receiving confirmation of obtaining a permission, obtain a permission to use an apparatus or module, for collecting the images and the laser point cloud data, in the terminal device running the client application, for example, obtain a permission to use a camera, a laser sensor or a laser radar in the terminal device running the client application. Then, in response to receiving an instruction for starting collecting the environmental data, the client application can collect respective groups of environmental data.

Next, after collecting several groups of environmental data, the client application can build the three-dimensional model of the pool based on the images and the laser point cloud data respectively corresponding to the images. Building a three-dimensional model based on images and distance data corresponding to respective points in the images is a mature technology and thus will not be redundantly described herein.

Figure 5:
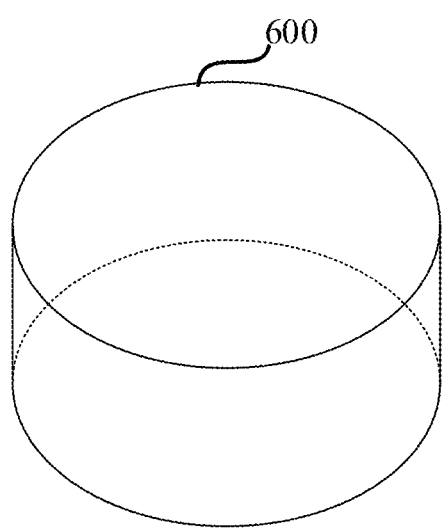
FIG. 5 is a schematic diagram illustrating a three-dimensional model according to one or more embodiments of the present disclosure.

The present disclosure provides a schematic diagram of a three-dimensional model. As shown in FIG. 5, the three-dimensional model 600 is a three-dimensional model corresponding to a circular pool.

Due to a limited computing power of the terminal device running the client application, the terminal device running the client application can send these groups of environmental data to a server which builds a three-dimensional model and returns it to the terminal device running the client application.

By applying the above-mentioned method, the three-dimensional model of the pool can be built to plan a cleaning path for cleaning the pool.

At step S104, based on the three-dimensional model, a cleaning path of an unmanned cleaning device coupled to the terminal device is determined, and sent to the unmanned cleaning device to instruct the unmanned cleaning device to clean the pool according to the cleaning path.

In one or more embodiments of the present disclosure, due to different usage conditions at different positions of the pool, the cleanliness of different regions can be different. For example, the user often leans against an eastern wall of the pool and thus the eastern wall may be heavily stained and needs to be cleaned, whereas other three walls may be slightly stained and do not need to be cleaned. Therefore, the client application can be provided with multiple cleaning modes, each of which corresponds to a different cleaning region.

In some embodiments, firstly, the client application can determine candidate cleaning paths respectively corresponding to the multiple cleaning modes by using a path planning model based on the three-dimensional model and the preset multiple cleaning modes. The multiple cleaning modes correspond to different cleaning regions respectively, for example, a region corresponding to a wall cleaning mode is a pool wall, a region corresponding to a floor cleaning mode is a pool floor, a region corresponding to a full cleaning mode is a combination of the pool wall and the pool floor, and a single-side wall cleaning mode corresponds to a single-side wall.

Next, a cleaning mode selection interface is displayed in the client application to prompt the user to select a cleaning mode, after a cleaning mode is selected, a candidate path corresponding to the selected cleaning mode is determined as a cleaning path, and then the cleaning path is sent to the unmanned cleaning device. In this way, the unmanned cleaning device can clean the pool according to the cleaning path.

In some embodiments, for ease of operation and higher cleaning efficiency, the cleaning mode can default to be the full cleaning mode such that all regions of the pool can be cleaned. That is, the client application can, based on the three-dimensional model, determine a cleaning path for cleaning all regions of the pool, determine the full cleaning mode is a cleaning mode selected by the user, and send the cleaning path corresponding to the full cleaning mode to the unmanned cleaning device.

In some embodiments, since the pool is actually cleaned by the unmanned cleaning device, after the cleaning path corresponding to the cleaning mode selected by the user is determined, it is required to place the unmanned cleaning device on the cleaning path. In some embodiments, the cleaning path corresponding to the cleaning mode selected by the user is determined, and based on the cleaning path, a start point of the cleaning path is determined as a placement point. The client application displays the placement point to prompt the user to place the unmanned cleaning device at the placement point.

Figure 6:
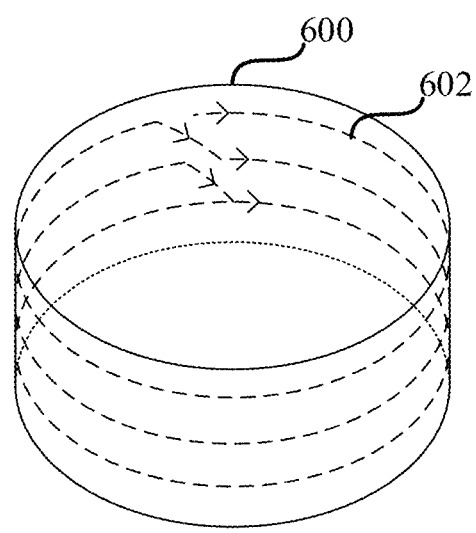
FIG. 6 is a schematic diagram illustrating a cleaning path according to one or more embodiments of the present disclosure.

The present disclosure provides a schematic diagram of a cleaning path. As shown in FIG. 6, the cleaning path 602 is marked inside the three-dimensional model 600 of the pool.

The unmanned cleaning device, after completing the cleaning of the top part of the pool wall, can perform cleaning along a direction indicated by an arrow in the cleaning path to clean a middle part of the pool wall, and, after completing the cleaning of the middle part of the pool wall, can continue cleaning along a direction indicated by an arrow in the cleaning path until completing the cleaning of the pool wall. It is to be noted that the cleaning path 602 is a cleaning path corresponding to the wall cleaning mode. Further, FIG. 6 only shows a schematic diagram of a cleaning path, and other cleaning path can also be used.

Figure 7:
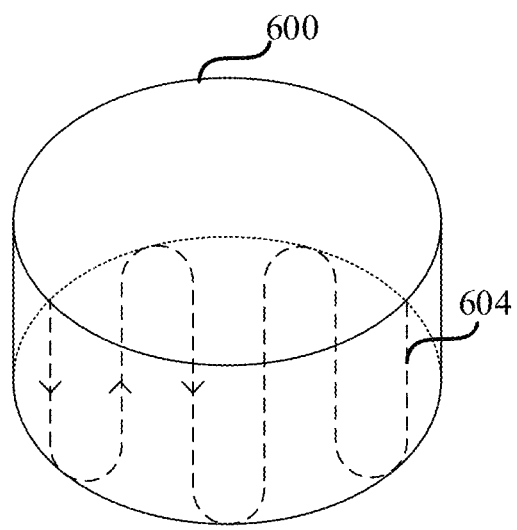
FIG. 7 is a schematic diagram illustrating a cleaning path according to one or more embodiments of the present disclosure.

The present disclosure further provides a schematic diagram of a cleaning path. As shown in FIG. 7, the cleaning path 604 is marked inside the three-dimensional model 600 of the pool. It is noted that the cleaning path 604 is a cleaning path corresponding to the floor cleaning mode. The unmanned cleaning device can perform cleaning along a direction indicated by an arrow in the cleaning path. Further, FIG. 7 only shows a schematic diagram of a cleaning path, and other cleaning path can also be used.

In some embodiments, since the placement point can be any position inside the pool, and the user carried with the unmanned cleaning device can have difficulty when moving in the pool, the client application can determine the position of the unmanned cleaning device in the pool and send a movement instruction to the unmanned cleaning device, where the movement instruction is configured to instruct the unmanned cleaning device to move to the placement position. The client application can, before determining the cleaning path, obtain the position of the unmanned cleaning device and plan respective cleaning paths with the position being the placement point.

Due to a limited computing power of the terminal device running the client application, the terminal device running the client application can send the three-dimensional model to the server which plans the cleaning path corresponding to each cleaning mode and returns it to the terminal device.

By applying the above-mentioned method, the client application can determine different cleaning modes for different cleaning scenarios, so as to increase the cleaning efficiency.

Based on the method of cleaning a pool as shown in FIG. 1, in response to receiving a startup instruction for the client application, the guidance information is displayed on the display screen of the terminal device to guide the user to collect a plurality of groups of environmental data including the images of the pool and the laser point cloud data corresponding to the images based on the specified poses; based on the images and the laser point cloud data corresponding to the images, the three-dimensional model of the pool is determined; and based on the three-dimensional model, the cleaning path of the unmanned cleaning device coupled to the terminal device is determined, and is sent to the unmanned cleaning device to instruct the unmanned cleaning device to clean the pool according to the cleaning path.

From the above-mentioned method, it can be seen that collecting of various data of the pool and planning of the cleaning path can be achieved by using the client application based on simple steps, thus increasing the cleaning efficiency and lowering the cleaning costs at the same time.

Figure 8:
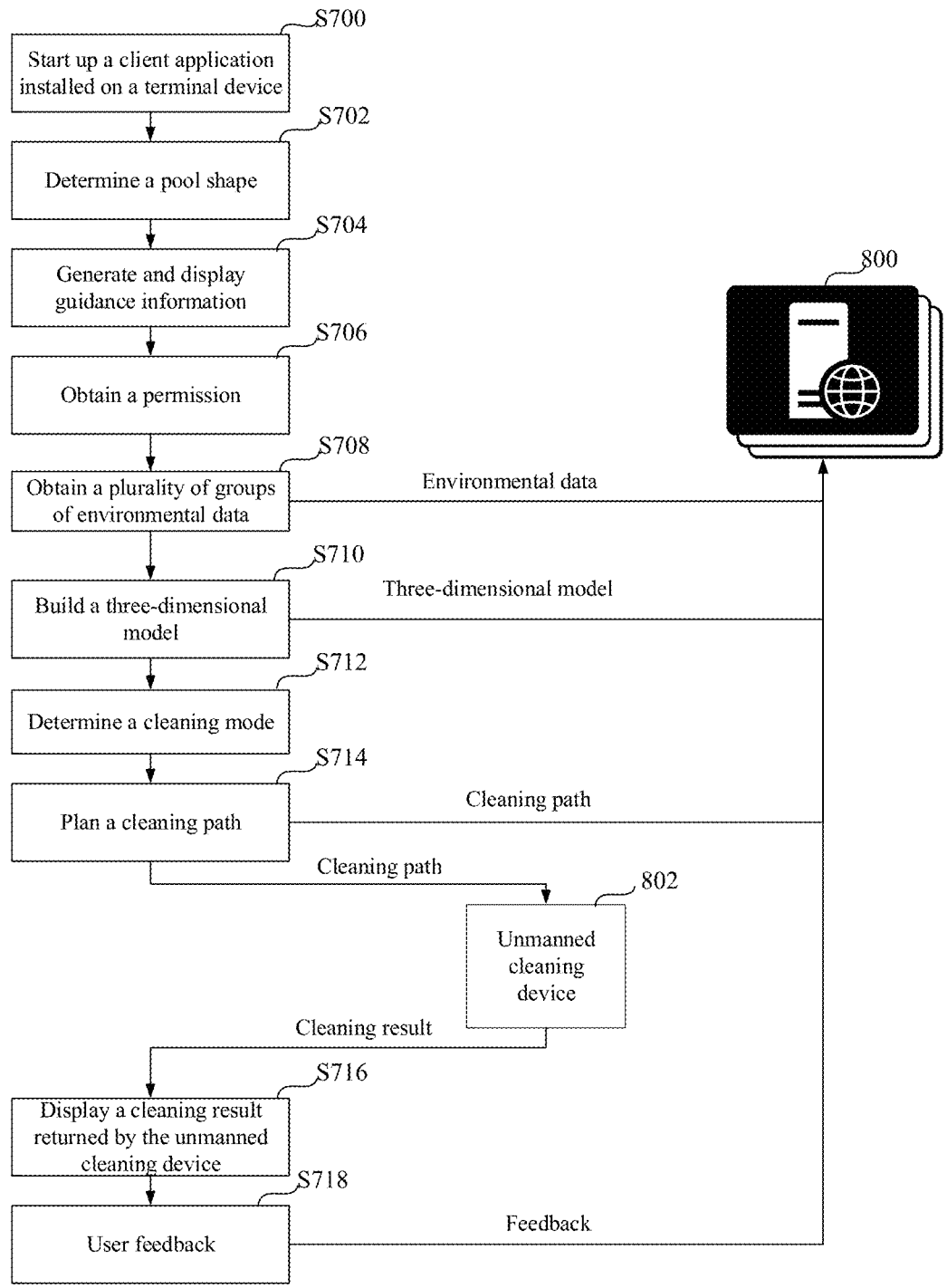
FIG. 8 is a schematic diagram illustrating an interactive flow according to one or more embodiments of the present disclosure.

In addition, the present disclosure provides a schematic diagram of an interactive flow as shown in FIG. 8, including steps S700 to S718.

At step S700, a client application installed in a terminal device is started up. The client application can be started up in response to receiving a startup instruction.

At step S702, a pool shape is determined. After the client application is started up, based on a received input from pool shape selection interface, a pool shape corresponding to the pool to be cleaned is determined as a target pool shape.

At step S704, guidance information is generated and displayed. After the target pool shape is determined, the client application can, based on the target pool shape, generate the guidance information including a plurality of collection poses and display it on the display screen of the terminal device to guide the user to collect respective groups of environmental data of the pool.

At step S706, a permission is obtained. Since apparatuses such as camera and laser radar are required to collect the environmental data, a permission to use the apparatuses such as camera and laser radar is to be obtained.

At step S708, a plurality of groups of environmental data are obtained. After the permission to use the apparatuses such as camera and laser radar is obtained, respective groups of environmental data are obtained in response to receiving an instruction for starting obtaining the environmental data. It is to be noted that the three-dimensional model can be built by the terminal device running the client application or a server 800. Therefore, the terminal device running the client application can send the respective groups of environmental data to the server 800.

At step S710, a three-dimensional model is built. After the respective groups of environmental data are obtained, the client application can build the three-dimensional model based on these groups of environmental data. It is to be noted that, because the planned path of the unmanned cleaning device can be generated by the terminal device running the client application or the server 800, the three-dimensional model can be sent to the server 800.

At step S712, a cleaning mode is determined. Since a full cleaning process may not be required for the pool, a cleaning mode, i.e., a cleaning region, can be determined based on a received cleaning mode selection instruction.

At step S714, a cleaning path is planned. It is to be noted that, in one or more embodiments of the present disclosure, the cleaning paths corresponding to respective cleaning modes can be firstly planned as candidate paths. Next, based on the selected cleaning mode, a candidate path corresponding to the selected cleaning mode is determined as the cleaning path. Further, the client application can send the cleaning path to the server 800.

At step S716, a cleaning result returned by the unmanned cleaning device is displayed. After the cleaning path is planned, the terminal device running the client application can send the cleaning path to the unmanned cleaning device 802 to instruct the unmanned cleaning device 802 to clean the pool according to the cleaning path, and receive and display a cleaning result returned by the unmanned cleaning device 802.

At step S718, user feedback is made. Due to presence of possible dirty regions subsequent to cleaning, the client application can receive feedback on the cleaning result from the user and determine the feedback, so as to optimize the path planning model based on the feedback and re-clean the dirty regions and the like.

Figure 9:
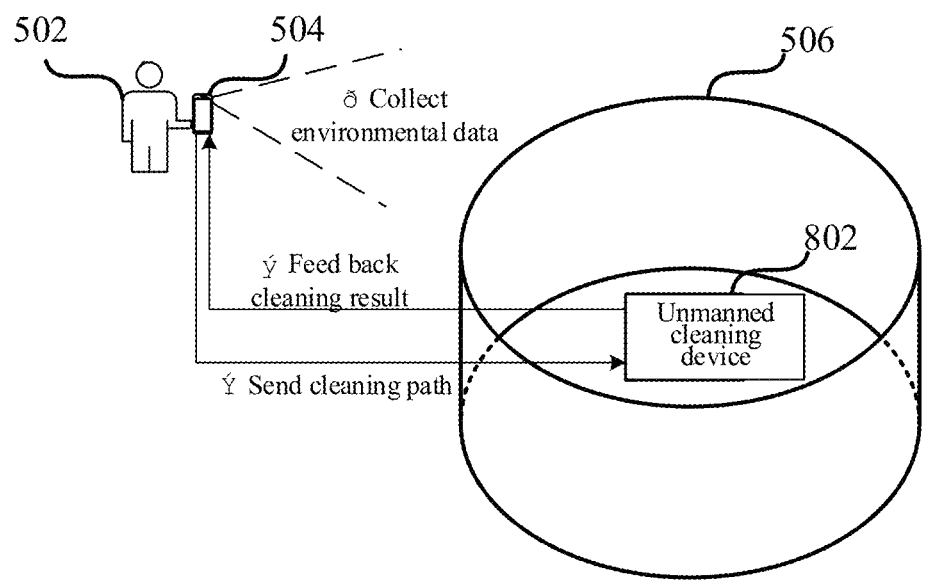
FIG. 9 is an interactive schematic diagram according to one or more embodiments of the present disclosure.

Furthermore, the present disclosure further provides an interactive schematic diagram. As shown in FIG. 9, the client application 504 installed in the terminal device carried by the user 502 can collect the environmental data of the pool 506, build a three-dimensional model based on the collected environmental data, plan a cleaning path based on the three-dimensional model, and send the cleaning path to the unmanned cleaning device 802 coupled to the terminal device. Hence, the unmanned cleaning device 802 can, after completing the cleaning of the pool 506, return a cleaning result to the client application 504.

Figure 10:
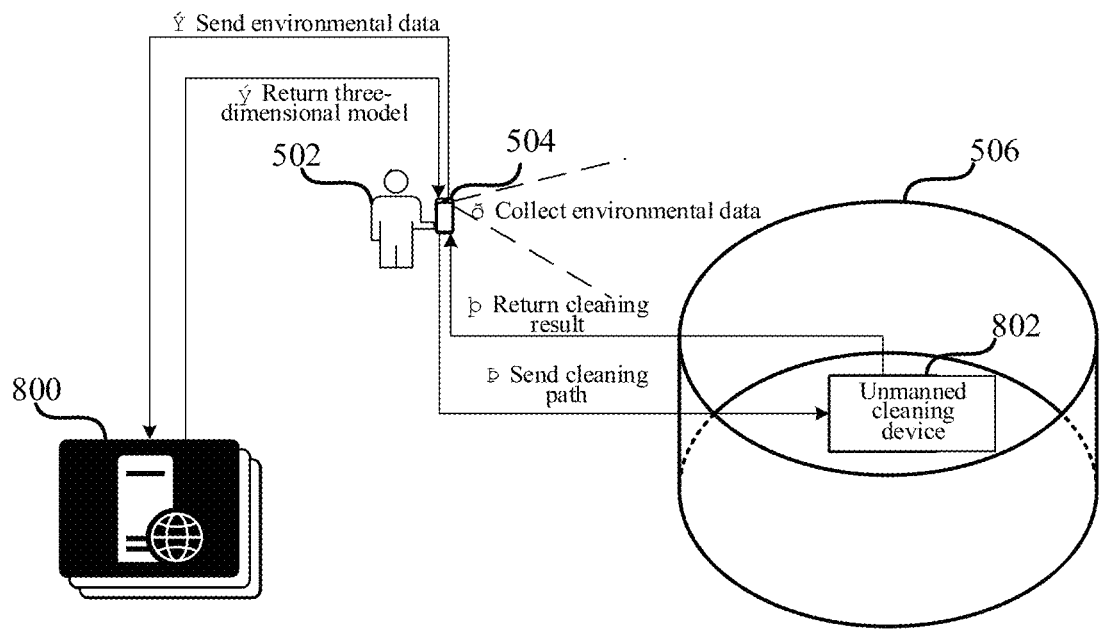
FIG. 10 is an interactive schematic diagram according to one or more embodiments of the present disclosure.

In addition, the present disclosure further provides an interactive schematic diagram. As shown in FIG. 10, the client application 504 installed in the terminal device carried by the user 502 can collect the environmental data of the pool 506, and send the environmental data to the server 800. The server 800 can build a three-dimensional model based on the received environmental data, and return the three-dimensional model to the client application 504. The client application 504 can plan a cleaning path based on the received three-dimensional model, and send the cleaning path to the unmanned cleaning device 802 coupled to the terminal device. Hence, the unmanned cleaning device 802 can, after completing the cleaning of the pool 506, return a cleaning result to the client application 504.

Figure 11:
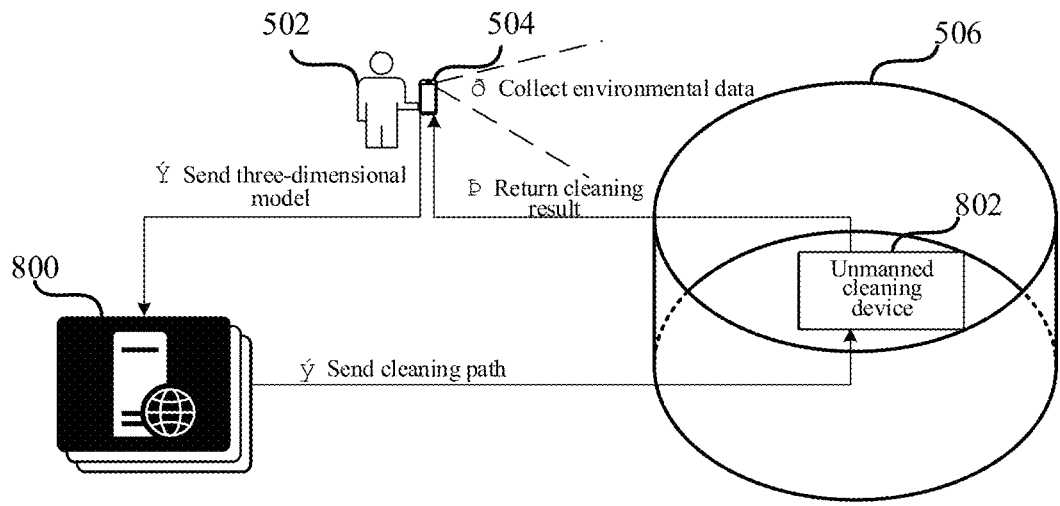
FIG. 11 is an interactive schematic diagram according to one or more embodiments of the present disclosure.

Furthermore, the present disclosure further provides an interactive schematic diagram. As shown in FIG. 11, the client application 504 installed in the terminal device carried by the user 502 can collect the environmental data of the pool 506, and build a three-dimensional model based on the collected environmental data, and send the three-dimensional model and an identifier of the unmanned cleaning device 802 to the server 800. The server can plan a cleaning path based on the received three-dimensional model and send the cleaning path to the unmanned cleaning device 802 based on the identifier of the unmanned cleaning device 802. Hence, the unmanned cleaning device 802 can, after completing the cleaning of the pool 506, return a cleaning result to the client application 504.

Figure 12:
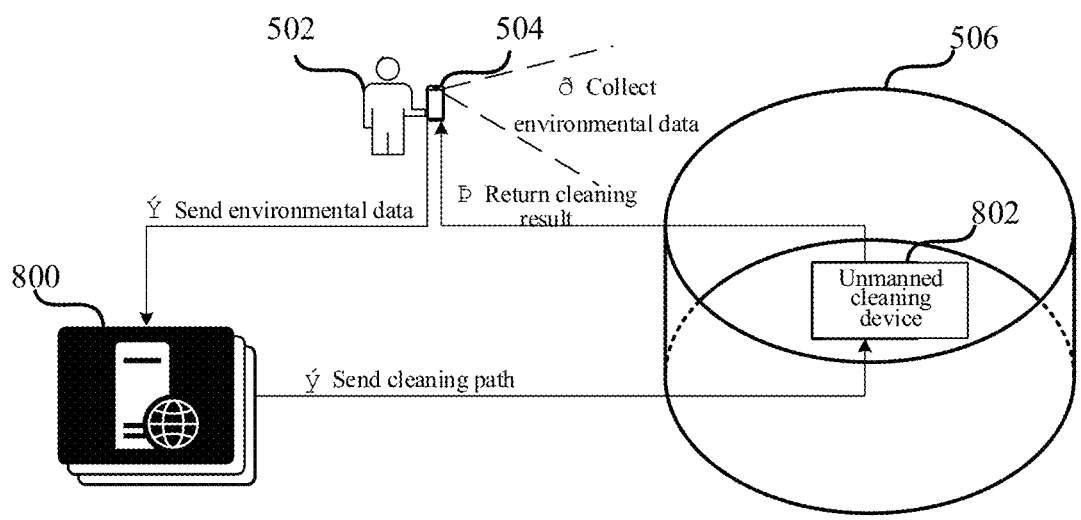
FIG. 12 is an interactive schematic diagram according to one or more embodiments of the present disclosure.

Furthermore, the present disclosure further provides an interactive schematic diagram. As shown in FIG. 12, the client application 504 installed in the terminal device carried by the user 502 can collect the environmental data of the pool 506, and send the collected environmental data and the identifier of the unmanned cleaning device 802 to the server 800. The server 800 can build a three-dimensional model based on the received environmental data, plan a cleaning path based on the three-dimensional model, and send the cleaning path to the unmanned cleaning device 802 based on the identifier of the unmanned cleaning device 802. Hence, the unmanned cleaning device 802 can, after completing the cleaning of the pool 506, return a cleaning result to the client application 504.

In addition, in one or more embodiments of the present disclosure, during a practical cleaning process, a shape of a pool can be different from all pool shapes preset in the client application. Thus, the client application can further, based on actual situation, determine a plurality of collection poses adapted for the pool shape.

In some embodiments, the client application can, in response to receiving an input from pool shape selection interface, determine a shape of the pool; generate a plurality of candidate collection poses based on the shape of the pool; and determine whether the environmental data collected based on the determined plurality of candidate collection poses is sufficient to build the three-dimensional model of the pool. If the environmental data collected based on the determined plurality of candidate collection poses is sufficient to build the three-dimensional model of the pool, the plurality of candidate collection poses are determined as specified poses. If the environmental data collected based on the determined plurality of candidate collection poses is insufficient to build the three-dimensional model of the pool, regions failed to be collected by the plurality of candidate collection poses are determined (that is, uncollected regions are determined), and collection poses for collecting environmental data corresponding to the uncollected regions are determined as supplementary poses. Finally, the plurality of candidate collection poses and the supplementary poses are determined as the specified poses. The client application can determine the shape of the pool based on an image uploaded by the user or a pattern drawn by the user and the like.

After determining the shape of the pool, the client application can also determine the specified poses in other methods. For example, based on the shape of the pool and a preset step length, all positions for collecting the environmental data of the pool and all collection angles facing toward the pool corresponding to respective positions are traversed. The collection data corresponding to each collection position and the collection angle of the collection position is determined as one group of collection data. These groups of collection data are combined to determine several collection data sets, and then a plurality of collection data sets capable of covering the entire region of the pool are selected from the several collection data sets as a plurality of candidate combinations. The collection positions and the collection angles of respective groups of collection data corresponding to a candidate combination with a minimum number of groups of collection data in the plurality of candidate combinations are determined as the specified poses. Alternatively, an upper limit threshold of the number of groups in the candidate combinations is determined, and from a plurality of candidate combinations with the number of groups no greater than the upper limit threshold in the candidate combinations, the collection positions and the collection angles of respective groups of collection data corresponding to a candidate combination with a largest total collection area are determined as the specified poses.

In other words, determining the specified poses can include: based on the target pool shape and the preset step length, determining M candidate collection poses, where M is an integer greater than 1, and each of the candidate collection poses includes a collection position and a collection angle facing toward the pool corresponding to the collection position; combining M groups of environmental data of the pool collected based on M candidate collection poses to obtain N sets, where N is an integer greater than 1; selecting one or more sets capable of covering the entire region of the pool from the N sets as one or more candidate sets; determining a plurality of candidate collection poses corresponding to a set with a minimum number of groups of environmental data in the one or more candidate sets as the specified poses, or, determining the candidate collection poses corresponding to a set with the number of groups of environmental data no greater than the upper limit threshold in the one or more candidate sets as the specified poses. The way that the specified poses actually are determined can be set based on actual needs and is not limited herein.

In addition, in one or more embodiments of the present disclosure, because there may be cases of inaccurate positions and angles and omissions etc., during the collection of the environmental data, it is required to determine whether a three-dimensional model can be built based on the collected environmental data after the collection of the environmental data.

In some embodiments, based on the collected environmental data, i.e., based on a plurality of images and the laser point cloud data respectively corresponding to the plurality of images, whether the three-dimensional model of the pool can be built is determined. If the three-dimensional model of the pool can be built, it is determined that the collected environmental data is sufficient to build the three-dimensional model. If the three-dimensional model of the pool cannot be built, based on the environmental data, supplementary poses of the environmental data to be supplementarily collected are determined and prompt information including the supplementary poses is displayed on the display screen of the terminal device to prompt the user to collect the environmental data based on the supplementary poses. After the environmental data is collected based on the supplementary poses, whether the three-dimensional model can be built is determined again based on the collected environmental data. When the three-dimensional model cannot be built, the supplementary poses are re-determined, and the user is prompted to re-collect the environmental data until the three-dimensional model can be built based on the collected environmental data. When the three-dimensional model can be built, it is determined that the collected environmental data is sufficient to build the three-dimensional model.

Since the pool is a closed concave structure enclosed by the floor and the walls, determining whether the collected environmental data is sufficient to build the three-dimensional model of the pool means that determining whether the collected environmental data is sufficient to build a full and closed three-dimensional model. When it is determined that, based on the collected environmental data, there is a gap in the built three-dimensional model, it is determined that the collected environmental data is insufficient to build the three-dimensional model of the pool. For example, when the three-dimensional model built based on the collected environmental data lacks an angle or a face, or cannot be closed, it is determined that the collected environmental data is insufficient to build the three-dimensional model of the pool.

For example, it can be determined whether a ratio of an amount of mutually-matching laser point cloud data in the environmental data to a total amount of collected laser point cloud data is greater than a preset threshold. If yes, it is determined that environmental data is sufficiently collected, and if no, it is determined that environmental data is insufficiently collected and data collection is continued. Alternatively, based on the positions of the collected environmental data and the angles at which the terminal faces during data collection, whether to continue data collection is determined and so on.

By applying the above-mentioned method, when the collected environmental data is insufficient to build the three-dimensional model, a prompt is given to collect supplementary environmental data and then the three-dimensional model is built based on the previously-collected environmental data and the supplementary-collected environmental data.

Figure 15A:
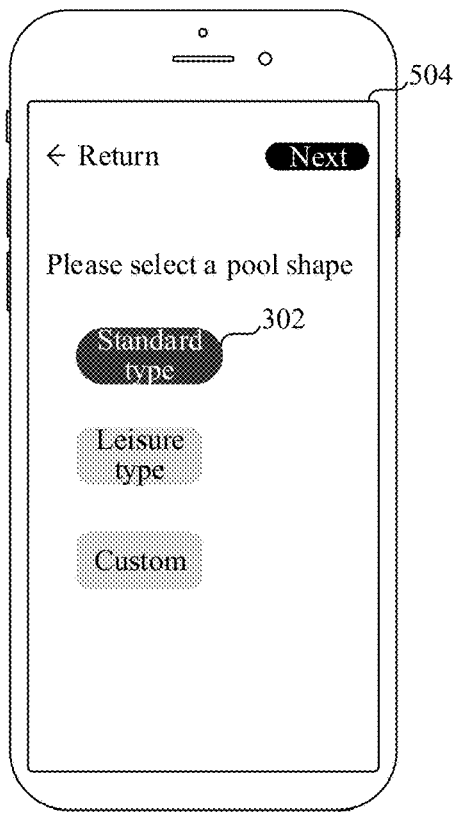
FIG. 15a is a schematic diagram of a pool type selection interface according to one or more embodiments of the present disclosure.

In addition, in one or more embodiments of the present disclosure, before the target pool shape is determined, the client application can display a pool type selection interface. FIG. 15a is a schematic diagram illustrating a pool type selection interface according to the present disclosure. In the pool type selection interface displayed by the client application 504, a plurality of pool types are displayed, and a selected standard type 302 is highlighted.

In some embodiments, the client application can display a preset pool type selection interface. The pool type selection interface includes pool type and pool material etc. Further, different pool types can include same pool shapes, for example, a standard type of pools includes a circular pool while a leisure type of pools also includes a circular pool.

Figure 15B:
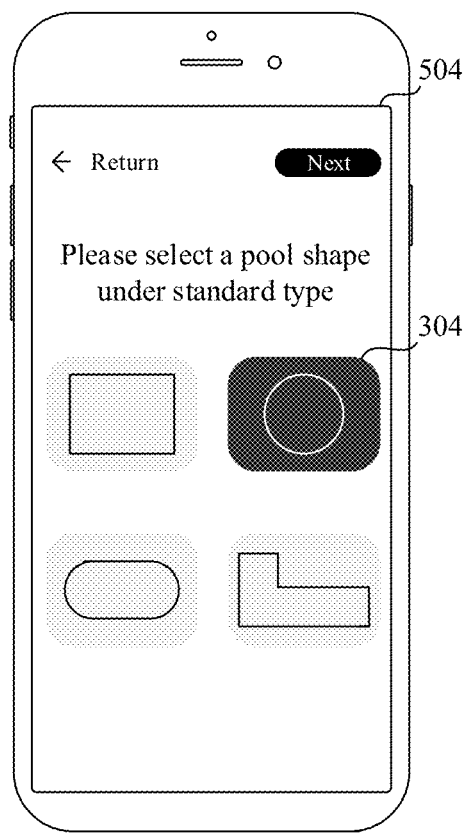
FIG. 15b is a schematic diagram of a pool shape selection interface according to one or more embodiments of the present disclosure.

After the pool type is selected, the client application can display a pool shape selection interface corresponding to the pool type. FIG. 15b is a schematic diagram illustrating a pool shape selection interface according to the present disclosure. After the standard type is selected, a plurality of pool shapes are displayed in the pool shape selection interface corresponding to the standard type of pools and displayed by the client application 504, and can be clicked to select a pool shape. When a circular pool 304 is clicked, the target pool shape is determined as circular and the circular pool 304 is highlighted.

By applying the above-mentioned method, the terminal device can obtain pool type information and thus the three-dimensional model of the pool can be more accurately built.

Furthermore, in one or more embodiments of the present disclosure, the client application can display a pool type and shape selection interface.

Figure 16:
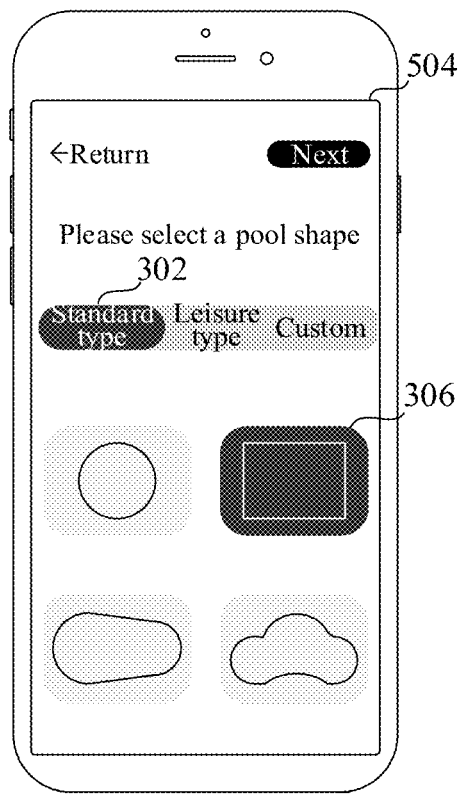
FIG. 16 is a schematic diagram of a pool type and shape selection interface according to one or more embodiments of the present disclosure.

In some embodiments, FIG. 16 shows a schematic diagram illustrating a pool type and shape selection interface according to the present disclosure. In the pool type and shape selection interface displayed by the client application 504, a pool type can be selected in a pool type selection region under the sentence "please select a pool shape". When a standard type 302 is selected, the standard type 302 is highlighted and a plurality of pool shapes corresponding to the standard type 302 are displayed below the pool type selection region. When an elliptical pool 306 is selected, the elliptical pool 306 is highlighted.

By applying the above-mentioned method, the client application can directly display a plurality of pool types and a plurality of pool shapes corresponding to respective pool types without opening new pages, which is convenient for user to select the pool shapes.

In addition, in one or more embodiments of the present disclosure, because information such as wall material, floor material, and pool depth cannot be reflected by the environmental data, such information can be collected by displaying information collection interface.

In some embodiments, the client application can, based on the determined target pool shape, determine one or more information collection problems, and display the information collection interface including the one or more information collection problems. The information collection interface is configured to collect characteristic information of the pool, and the characteristic information of the pool includes a pool depth and a pool size as well as information such as a wall material and a floor material. The client application can collect the characteristic information of the pool in response to the information input from the information collection interface, i.e., replies made by the user to the information collection problems in the information collection interface. Therefore, when building the three-dimensional model of the pool, the three-dimensional model of the pool can be built based on the collected characteristic information of the pool, the collected images and the laser point cloud data respectively corresponding to the images. Furthermore, in order to avoid affecting the use experience of the user, the number of the information collection problems is not greater than a preset problem threshold.

Figure 17:
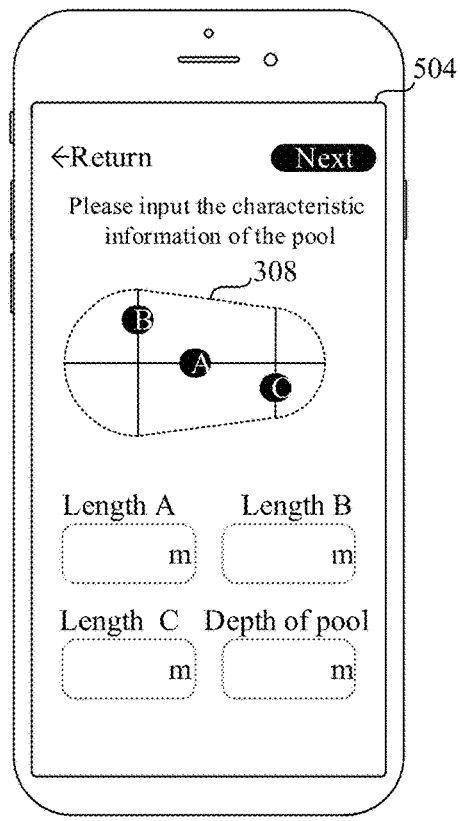
FIG. 17 is a schematic diagram of an information collection interface according to one or more embodiments of the present disclosure.
Figure 18:
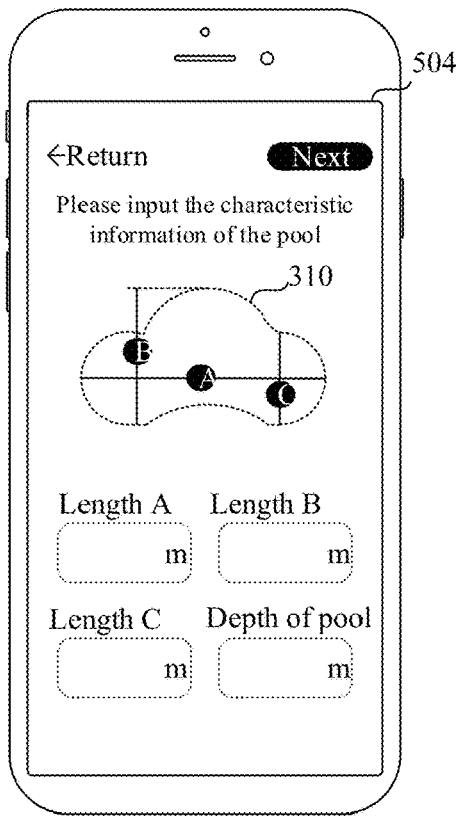
FIG. 18 is a schematic diagram of an information collection interface according to one or more embodiments of the present disclosure.

As shown in FIG. 17 and FIG. 18, FIG. 17 shows a schematic diagram illustrating an information collection interface according to the present disclosure. In the information collection interface displayed in the client application 504, a pool shape and numbers of information to be collected are displayed under the sentence "please input the characteristic information of the pool" and input boxes for inputting various characteristic information are displayed under the pool shapes. In the information collection interface, the words "length A" represents an actual length of line segment A in the pool shape corresponding to the actual pool; the words "length B" represents an actual length of line segment B in the pool shape corresponding to the actual pool; the word "length C" represents an actual length of line segment C in the pool shape corresponding to the actual pool; the "m" in the input boxes is meter as unit. FIG. 18 shows a schematic diagram illustrating an information collection interface according to the present disclosure. In the information collection interface displayed in the client application 504, a pool shape and numbers of information to be collected are displayed under the sentence "please input the characteristic information of the pool" and input boxes for inputting various characteristic information are displayed under the pool shape. In the information collection interface, the word "length B" represents an actual length of line segment B in the pool shape corresponding to the actual pool. As shown in FIG. 18, a part of the line segment B is located outside the pool. The way that the characteristic information to be collected is determined is not limited in the present disclosure and can be set based on actual needs.

By applying the above-mentioned method, by displaying the information collection interface including one or more information collection problems, the information that cannot be reflected by the environmental data can be collected. Thus, the three-dimensional model of the pool can be built more accurately.

Furthermore, in one or more embodiments of the present disclosure, after the target pool shape is determined and the characteristic information of the pool is collected by the information collection interface, the three-dimensional model of the pool can be built based on the target pool shape and the characteristic information.

By applying the above-mentioned method, the client application can, based on the information input from the information collection interface, determine the three-dimensional model of the pool.

Furthermore, in one or more embodiments of the present disclosure, based on the collected images of the pool and the laser point cloud data respectively corresponding to the images, the three-dimensional model of the pool can be built. Moreover, based on the target pool shape and the characteristic information corresponding to the target pool shape, the three-dimensional model of the pool can be built. In some embodiments, two three-dimensional models can be built based on the above two methods respectively, and based on the two three-dimensional models, the three-dimensional model of the pool is determined.

In some embodiments, the three-dimensional model determined based on the images and the laser point cloud data respectively corresponding to the images is determined as a first model, and the three-dimensional model determined based on the target pool shape and the characteristic information corresponding to the target pool shape is determined as a second model.

The client application can determine a similarity between the first model and the second model, and determine whether the similarity is greater than a preset similarity threshold. For example, if the similarity between the first model and the second model is 81% and the similarity threshold is 90%, it is determined that the first model and the second model are not similar. If the similarity between the first model and the second model is greater than the preset similarity threshold, the client application can divide the first model into a plurality of grids based on a preset step length and divide the second model into a plurality of grids based on a same preset step length. Same grids and one or more deviation grids are determined based on the positions of grids in the first model and the second model. A ratio of a number of same grids to the number of grids of the model with a larger number of grids in the first model and the second model is determined as the similarity. Based on the one or more deviation grids between the first model and the second model, one or more deviation positions are determined. If the one or more deviation positions correspond to the position of the pool size in characteristic information, the one or more deviation positions are determined to be associated with the characteristic information of the pool. Since the characteristic information is the information input by the user and has high accuracy, the terminal device can determine the three-dimensional model of the pool based on the second model.

As shown in FIG. 17, if the deviation positions are positions corresponding to the endpoints of segment A as shown in FIG. 17, it is determined that the deviation positions are associated with the characteristic information, and the three-dimensional model of the pool is determined based on the second model. If the deviation positions are not associated with the characteristic information of the pool, since the pool shape selected by the user can be different from the actual pool shape, the three-dimensional model of the pool can be determined based on the first model. In order to more accurately determine the three-dimensional model of the pool, the client application can also determine deviation collection poses based on the deviation positions and display the deviation collection poses to prompt the user to collect the environmental data of the pool based on the deviation collection poses. According to the re-collected environmental data, the first model is adjusted and the three-dimensional model of the pool is determined based on the adjusted first model. If there is no deviation position, the client application can determine the first model as the three-dimensional model of the pool.

In other words, based on the first model and the second model, determining the three-dimensional model of the pool includes: gridding the first model to obtain a first grid model and gridding the second model to obtain a second grid model, where a unit grid of the first grid model is same as a unit grid of the second grid model; determining whether a similarity between the first grid model and the second grid model is greater than or equal to a similarity threshold; in response to determining that the similarity between the first grid model and the second grid model is greater than or equal to the similarity threshold, determining one or more deviation grids between the first grid model and the second grid model; based on the one or more deviation grids, determining deviation positions; based on the deviation positions, determining a deviation collection pose; displaying the deviation collection pose to prompt the user to collect deviation environmental data of the pool based on the deviation collection pose; based on the deviation environmental data, adjusting the first model; determining the adjusted first model as the three-dimensional model of the pool.

Figure 19:
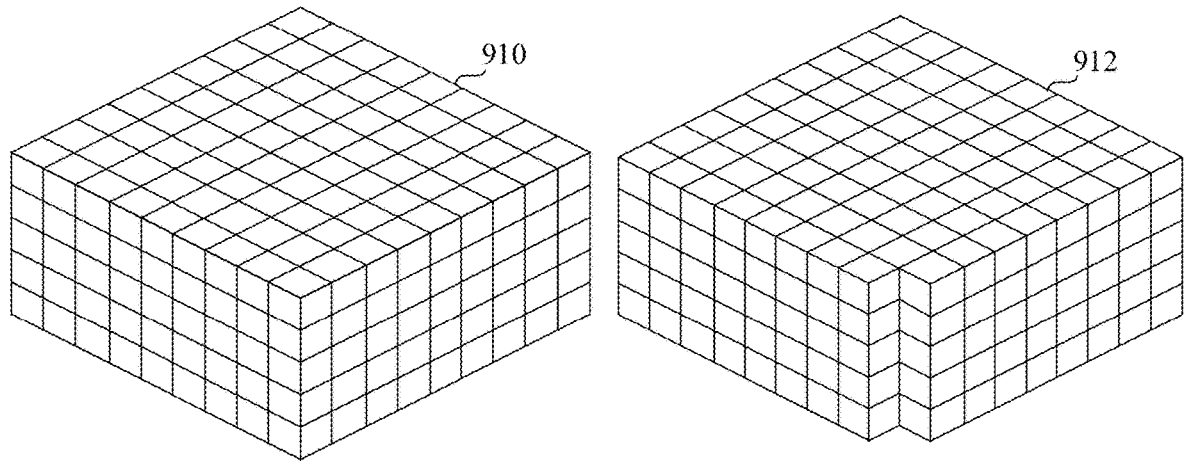
FIG. 19 is a schematic diagram of determining a similarity according to one or more embodiments of the present disclosure.

FIG. 19 is a schematic diagram of determining a similarity according to the present disclosure. As shown in FIG. 19, the first model 910 and the second model 912 are divided into a plurality of regions respectively, where the first model 910 is a cuboid and the second model 912 is a cuboid with a missing region.

The client application can determine the similarity between the first model and the second model with a plurality of methods. For example, the first model and the second model are divided into a plurality of regions with same size respectively, as shown in FIG. 19. Then, each region of the first model is compared with each region of the second model based on size and position, to determine a ratio of the regions of same size and position to a total region as the similarity, where the total region is a number of regions of the model with a larger number of regions in the first model and the second model. As shown in FIG. 19, the first model 910 is divided into 405 regions in total, and the second model 912 is divided into 400 regions in total. The first model 910 has 400 regions same in size and position to those of the second model 912, and the similarity is 0.988. The regions in the first model which are different in size and position from the regions of the second model are determined as deviation regions, and the regions in the second model which are different in size and position from the regions of the first model are also determined as deviation regions. As shown in FIG. 19, five regions at the lower part of the second model 912 are absent whereas five regions at the same position of the first model 910 are present, and the five regions are determined as deviation regions. Alternatively, the client application can determine a standard position for the first model and the second model, and based on the standard position, the first model and the second model are overlapped for comparison to determine an overlapping region and a non-overlapping region between the first model and the second model. Then, a volume of a model with a larger volume in the first model and the second model is determined as a total volume, and a ratio of a volume of the overlapping region to the total volume is determined as the similarity. In other words, a model with a larger number of grids in the first model and the second model is determined as a reference grid model, and a ratio of the number of grids of the model other than the reference grid mode in the first model and the second model to the number of grids of the reference grid model is determined as the similarity. The non-overlapping regions are determined as the deviation regions. The way that the similarity between the first model and the second model is determined is not limited in the present disclosure and can be set based on actual needs.

By applying the above-mentioned method, the client application can, based on the two built three-dimensional models, more accurately determine the three-dimensional model of the pool.

In addition, conventionally, after the unmanned cleaning device cleans the pool, the user can only visually see the change of the pool but cannot know about the cleaning result of the pool from the data level. Therefore, in one or more embodiments of the present disclosure, the client application can receive and display the cleaning result in data level from the unmanned cleaning device.

In some embodiments, the client application receives and displays a cleaning result from the unmanned cleaning device, where the cleaning result includes one or more of a ratio of a total cleaning area to a total area of the pool, an overlapping degree of a planned path and an actual cleaning path, a total cleaning area, an average cleaning speed, or an accumulative cleaning time. In other embodiments, the cleaning result can also include other data, for example, a maximum cleaning speed, an estimated cleaning time, a difference between an estimated cleaning time and an accumulative cleaning time, and the like. The cleaning speed refers to a ratio of a movement distance of the unmanned cleaning device to a movement time of the unmanned cleaning device, that is, a movement speed of the unmanned cleaning device. The average cleaning speed is a ratio of a total length of the actual cleaning path to the accumulative cleaning time, and the maximum cleaning speed is a maximum movement speed of the unmanned cleaning device in a cleaning process.

Since the unmanned cleaning device is mainly used to clean a pool, the client application can receive cleaning information from the unmanned cleaning device and determine the cleaning result based on the cleaning information and then display the cleaning result. The cleaning information includes a cleaning time and an actual cleaning path and the like.

By applying the above-mentioned method, the client application can display the cleaning result such that the user can more visually and more accurately know the working result of the unmanned cleaning device.

Furthermore, in one or more embodiments of the present disclosure, since the unmanned cleaning device may miss some regions or do poor cleaning in some regions or the like during a cleaning process, the client application can receive feedback from the user for the cleaning result and adjust a path planning model.

In some embodiments, the client application can determine the cleaning regions of the unmanned cleaning device based on the cleaning path. In one or more embodiments of the present disclosure, the cleaning path is a candidate path corresponding to a cleaning mode selected by the user. Thus, the server can also directly obtain the cleaning region corresponding to the cleaning mode selected by the user, where the cleaning region is a cleaning region desired by the user to be cleaned and may be different from the actual cleaning region cleaned by the unmanned cleaning device.

Based on the cleaning region, a feedback interface including the cleaning region is displayed to prompt the user to feed back various problems occurring to the unmanned cleaning device in and after a cleaning process. The client application can directly display the feedback interface after displaying the cleaning result, or display the feedback interface in response to a corresponding button being pressed. The feedback interface can be a separate page or a pop-up window, where the form of the feedback interface is not limited in the present disclosure and can be set based on actual needs.

In addition, the client application can, in response to receiving feedback on the cleaning result from the feedback interface, determine to-be-recleaned regions. The to-be-recleaned regions can be determined in several methods. For example, the cleaning region in the feedback interface can be divided into a plurality of sub-regions so as to mark dirty sub-regions. The marked sub-regions will have color change after being marked, and these marked sub-regions are the to-be-recleaned regions. Alternatively, the feedback interface can also provide the three-dimensional model of the pool, such that those dirty or missed regions can be directly marked by closed patterns, line segments and dots etc., in the three-dimensional model, and the marked regions are the to-be-recleaned regions. Alternatively, the feedback interface can provide multiple options, for example, eastern wall uncleaned, pool floor uncleaned and the like, such that a corresponding option can be directly selected to determine a to-be-recleaned region.

Figure 20:
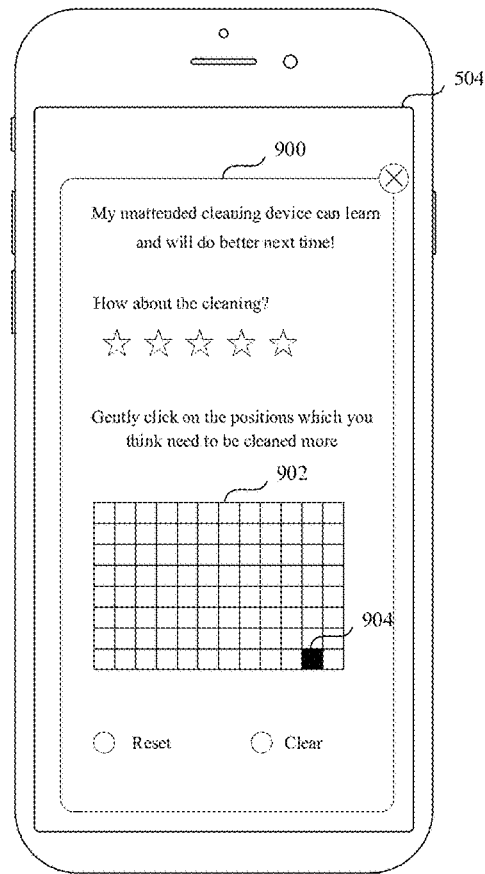
FIG. 20 is a schematic diagram of a feedback interface according to one or more embodiments of the present disclosure.

The present disclosure provides a schematic diagram of feedback interface. As shown in FIG. 20, the feedback interface 900 displayed in the client application 504 is displayed in the form of pop-up window. The feedback interface 900 displays the sentences such as "my unmanned cleaning device can learn and will do better next time!", "how about the cleaning?", and "gently click on the positions which you think need to be cleaned more". A region for making comments is displayed under the sentence "how about the cleaning?". The cleaning region 902 is displayed under the sentence "gently click on the positions which you think need to be cleaned more". If the sub-region 904 in the cleaning region 902 is clicked, the sub-region 904 will have color change, and the sub-region 904 is marked as to-be-recleaned region.

Next, the client application can, based on the determined to-be-recleaned region, the cleaning path, and the feedback, optimize the path planning model for determining the cleaning path with the aim of reducing the area of the to-be-recleaned region.

The client application can also determine a to-be-recleaned region based on the cleaning result. In some embodiments, the client application can determine a cleaning trajectory of the unmanned cleaning device based on the cleaning result and determine a missed region as a to-be-recleaned region based on the cleaning trajectory.

The client application can, based on the determined to-be-recleaned region and the cleaning path, optimize the path planning model for determining the cleaning path with the aim of reducing the area of the to-be-recleaned region. Because some to-be-recleaned regions have been cleaned once with an unsatisfying cleaning result by the unmanned cleaning device during a cleaning process, the path planning model can be optimized with the aim of repeatedly cleaning the to-be-recleaned regions, increasing the intensity of cleaning the to-be-recleaned regions and reducing the speed of cleaning the to-be-recleaned regions.

By applying the above-mentioned method, based on the feedback and the cleaning result, the path planning model can be optimized to increase the cleaning efficiency of the pool.

Furthermore, in one or more embodiments of the present disclosure, in order to increase the cleaning efficiency of the pool, the client application can display a feedback interface including a preset region for making comments to prompt the user to make comments on the cleaning result of the pool.

In some embodiments, the feedback interface can include a preset region for making comments. The client application can determine a number of cleaning times of the to-be-recleaned region in this feedback based on the comments of the user. For example, the preset region for making comments includes five unlighted stars which can be lighted up by clicking on it. More lighted stars mean the user is more satisfied with the cleaning result, and the to-be-recleaned region in this feedback will be cleaned less times. When five stars are lighted up, the to-be-recleaned region in this feedback will be cleaned once. When three stars are lighted up, the to-be-recleaned region in this feedback will be cleaned three times. When one star is lighted up, the to-be-recleaned region in this feedback will be cleaned five times.

In addition, the client application can also adjust parameters of the path planning model based on the comments of the user. For example, there is a reward mechanism in the path planning model: when five stars are lighted up, a reward parameter is determined as 5; when three stars are lighted up, the reward parameter is determined as 3; when one star is lighted up, the reward parameter is determined as 1. Alternatively, the comments can be taken as one of parameters for determining a loss of the path planning model. When other parameters are consistent, the more lighted stars are, the smaller loss of the path planning model is.

As shown in FIG. 20, in the feedback interface 900 displayed in the form of pop-up window in the client application 504, the sentence "how about cleaning?" and five unlighted stars displayed under the sentence are the region for making comments.

By applying the above-mentioned method, by receiving the comments on the feedback interface, feedback on cleanliness is determined, so as to more accurately optimize the path planning model.

In addition, in one or more embodiments of the present disclosure, the client application can, after determining the unmanned cleaning device completes the cleaning of the pool, directly display the feedback interface including the cleaning region, to prompt the user to make feedback on the cleaning result. The client application can, in response to an operation of the user on the feedback interface, determine a sub-region marked by the user in the cleaning region on the feedback interface as a to-be-recleaned region. The client application can, based on the to-be-recleaned region and the cleaning path, optimize the path planning model for determining the cleaning path with the aim of reducing the area of the to-be-recleaned region.

The cleaning region can be determined based on the cleaning path or based on a cleaning region corresponding to a cleaning mode selected by the user. The way of determining the cleaning region is not limited in the present disclosure and can be set based on actual needs.

By applying the above-mentioned method, after the unmanned cleaning device completes cleaning, the feedback interface is directly displayed to obtain the feedback of the user and realize optimization to the path planning model.

Furthermore, in one or more embodiments of the present disclosure, in order to increase the cleaning efficiency for the pool and reduce the area of the to-be-recleaned region, the client application can determine different path planning models for different pools.

In some embodiments, the client application can, based on feedback on cleanliness received from the feedback interface, optimize a path planning model corresponding to the user logging onto the client application, so as to increase the cleaning efficiency and reduce the area of the to-be-recleaned region by using the optimized path planning model for cleaning the pool. For different login users, the client application can provide different path planning models.

If the login user of the client application needs to clean a plurality of pools, the client application can also provide a plurality of path planning models for different pools, so as to increase the cleaning efficiency.

Furthermore, the client application has a limited storage space and the path planning model occupies a large storage space. Therefore, the client application does not store the path planning model but store the parameters of the path planning model, or the parameters of the path planning model and an identifier of the login user.

By applying the above-mentioned method, the client application can determine different path planning models for different login users so as to increase the cleaning efficiency.

Furthermore, in one or more embodiments of the present disclosure, since some regions may not be cleaned properly during the cleaning process of the unmanned cleaning device, that is, some regions may not be cleaned well in one cleaning process, the unmanned cleaning device can clean, several times, the regions which may not be cleaned well in one cleaning process.

In some embodiments, the client application can obtain a cleaning result and determine, based on the cleaning result, a plurality of cleaning images collected by the unmanned cleaning device during a process of cleaning the pool. Since the unmanned cleaning device needs to clean the pool along a planned path and the water flow in the pool can affect the movement of the unmanned cleaning device, the unmanned cleaning device is provided with an image collecting module. The unmanned cleaning device can change its movement direction based on the collected images and can also store the collected images as a part of the cleaning result sent to the client application.

The client application can obtain to-be-recleaned regions and determine positions of the to-be-recleaned regions in the pool, and determine cleaning images corresponding to the to-be-recleaned regions as labeled images based on one or more cleaning images collected by the unmanned cleaning device in a process of cleaning the pool. The labeled images correspond to dirty regions in the pool that are not cleaned up in one clean process, and in other words, the labeled images correspond to the to-be-recleaned regions.

The client application can send the determined labeled images to the unmanned cleaning device, such that the unmanned cleaning device can match the one or more cleaning images collected by the unmanned cleaning device with the labeled images in a subsequent cleaning process. If there is a cleaning image successfully matching any one of the labeled images and the region corresponding to the cleaning image is already cleaned, the unmanned cleaning device can perform second cleaning for the region corresponding to the cleaning image.

By applying the above-mentioned method, the client application can send data to the unmanned cleaning device such that the dirty regions in the pool can be cleaned several times.

Furthermore, in one or more embodiments of the present disclosure, it is possible that a plurality of to-be-recleaned regions are determined, and thus the client application can determine a second cleaning path so as to clean the pool well.

In some embodiments, the to-be-recleaned region is determined based on the cleaning result and the feedback. The to-be-recleaned region can be a region marked by the user in the three-dimensional model of the feedback interface in the client application, or a missed region determined based on the cleaning trajectory of the cleaning result or the like.

Based on the to-be-recleaned region and the three-dimensional model, a cleaning path is re-planned and then taken as a second cleaning path. The second cleaning path is sent to the unmanned cleaning device to instruct the unmanned cleaning device to clean the pool again according to the second cleaning path. It is noted that, when the cleaning path is re-planned, an ending point of the first planned cleaning path is taken as a start point of the second cleaning path, that is, a current position of the unmanned cleaning device is taken as the start point of the second cleaning path.

By applying the above-mentioned method, when the pool is not cleaned well, the pool can be cleaned again by using the unmanned cleaning device to achieve full cleaning for the pool.

Furthermore, in one or more embodiments of the present disclosure, the user can desire to change a cleaning mode. Therefore, during a cleaning process, the client application can instruct the unmanned cleaning device to pause cleaning at any time and re-collect the environmental data and instruct the unmanned cleaning device to re-clean the pool.

In some embodiments, the client application can, in response to receiving an input for indicating the unmanned cleaning device to pause working, send a pause instruction to the unmanned cleaning device cleaning the pool to instruct the unmanned cleaning device to temporarily stop working. Then, guidance information is displayed on the display screen of the terminal device to guide the user to collect the environmental data based on the specified poses. Next, based on the environmental data, a three-dimensional model of the pool is re-built, and then based on the re-built three-dimensional model, a cleaning path is re-planned. A startup instruction including the re-planned cleaning path is sent to the unmanned cleaning device to start cleaning again according to the re-planned cleaning path.

The client application can also directly plan a plurality of candidate paths based on the three-dimensional model collected in the first time and determine a candidate path corresponding to a selected cleaning mode as a cleaning path.

By applying the above-mentioned method, the unmanned cleaning device can be paused at any time and restart cleaning the pool after a startup instruction is received.

Figure 13:
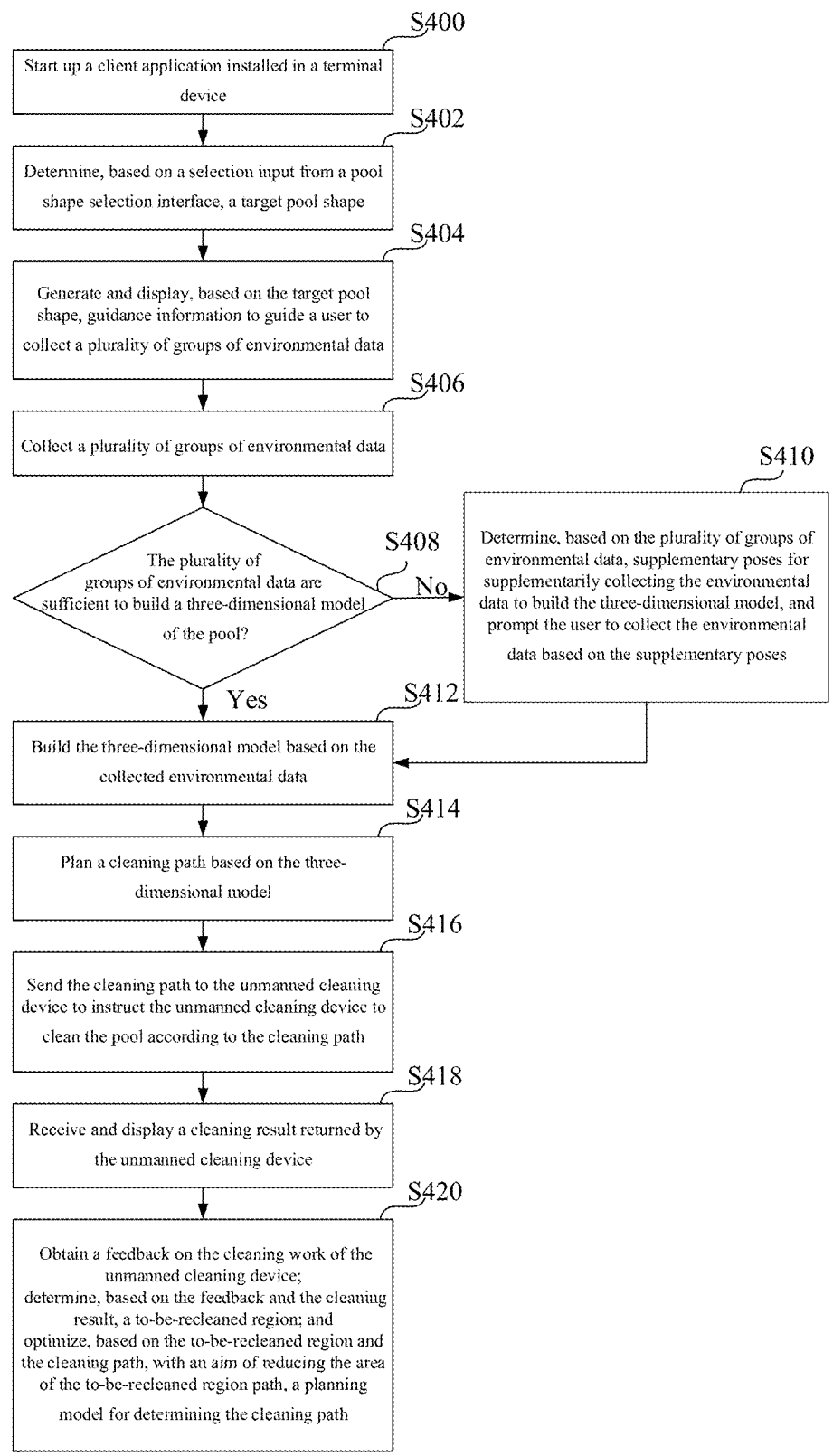
FIG. 13 is a flowchart of cleaning a pool according to one or more embodiments of the present disclosure.

Furthermore, the present disclosure further provides a flowchart of a method of cleaning a pool, as shown in FIG. 13.

At step S400, a client application installed in a terminal device is started up. The method is performed by the client application run on the terminal device.

At step S402, based on a selection input from a pool shape selection interface, a target pool shape is determined. In order to increase the cleaning efficiency, multiple pool shapes can be preset in the client application for selection.

At step S404, based on the target pool shape, guidance information is generated and displayed to guide a user to collect a plurality of groups of environmental data. When the target pool shape is selected, based on preset collection poses corresponding to the target pool shape, the guidance information including the collection poses can be determined and displayed to guide a user to collect a plurality of groups of environmental data of the pool based on the collection poses.

At step S406, a plurality of groups of environmental data are collected.

At step S408, whether the plurality of groups of environmental data are sufficient to build a three-dimensional model of the pool is determined. Because part of the environmental data may be omitted to collect, after respective groups of environmental data are collected, it is required to determine whether the groups of collected environmental data are sufficient to build the three-dimensional model of the pool. If yes, step S412 is performed and otherwise, step S410 is performed.

At step S410, based on the plurality of groups of environmental data, supplementary poses for supplementarily collecting the environmental data to build the three-dimensional model are determined, and the user is prompted to collect the environmental data based on the supplementary poses, and then step S412 is performed.

At step S412, the three-dimensional model is built based on the collected environmental data.

At step S414, a cleaning path is planned based on the three-dimensional model.

At step S416, the cleaning path is sent to the unmanned cleaning device to instruct the unmanned cleaning device to clean the pool according to the cleaning path.

At step S418, a cleaning result returned by the unmanned cleaning device is received and displayed. In order to allow the user to more accurately and more visually know the cleaning result of the unmanned cleaning device, the client application can receive and display the cleaning result returned by the unmanned cleaning device.

At step S420, feedback on the cleaning work of the unmanned cleaning device is obtained, and a to-be-recleaned region is determined based on the feedback and the cleaning result, and based on the to-be-recleaned region and the cleaning path, a path planning model for determining the cleaning path is optimized with the aim of reducing the area of the to-be-recleaned region. Since a path planned by the path planning model may have a deviation, the path planning model can be optimized.

It is noted that all acts of obtaining signal, information or data in the present disclosure are all carried out with authorization of corresponding apparatus owners under the precondition of complying with corresponding data protection laws and regulations of the country where the acts are located.

The above descriptions are the method of cleaning a pool according to one or more embodiments of the present disclosure. Based on the same idea, the present disclosure further provides a corresponding apparatus for cleaning a pool, as shown in FIG. 21.

Figure 21:
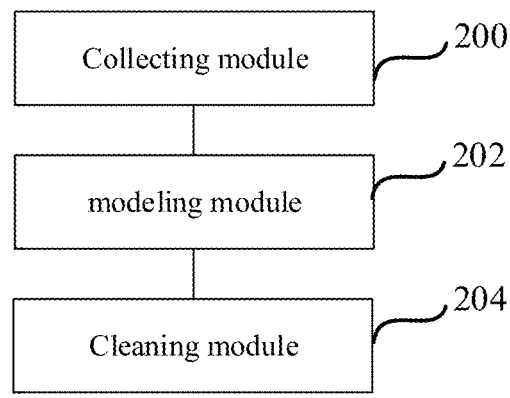
FIG. 21 is a schematic diagram illustrating an apparatus for cleaning a pool according to one or more embodiments of the present disclosure.

FIG. 21 is a schematic diagram illustrating an apparatus for cleaning a pool according to the present disclosure, which is applied to a client application installed in a terminal device. The apparatus includes a collecting module 200, a modeling module 202 and a cleaning module 204.

The collecting module 200, is configured to, in response to receiving a startup instruction for the client application, display guidance information on a display screen of the terminal device, where the guidance information is configured to guide a user to collect environmental data of the pool by using the terminal device based on specified poses, and the environmental data includes images of the pool and laser point cloud data respectively corresponding to the images.

The modeling module 202 is configured to, based on the images and the laser point cloud data respectively corresponding to the images, determine a three-dimensional model of the pool.

The cleaning module 204 is configured to, based on the three-dimensional model, determine a cleaning path of an unmanned cleaning device coupled to the terminal device, and send the cleaning path to the unmanned cleaning device to instruct the unmanned cleaning device to clean the pool according to the cleaning path.

In some embodiments, the collecting module 200 is configured to, based on preset pool shapes, display a pool shape selection interface, and in response to receiving an input of pool shape selection, determine a target pool shape.

In some embodiments, the collecting module 200 is configured to, based on a pool region corresponding to the target pool shape, determine a plurality of collection poses corresponding to the target pool shape as specified poses, where a region of the environmental data collected based on the plurality of collection poses covers the pool region, and each of the plurality of collection poses includes a collection position and a collection orientation corresponding to the collection position; generate and display the guidance information based on the specified poses, where the guidance information is configured to guide the user to collect the environmental data of the pool based on the specified poses.

In some embodiments, the modeling module 202 is configured to, based on the images and the laser point cloud data respectively corresponding to the images, determine whether the three-dimensional model of the pool can be built; if the three-dimensional model of the pool can be built, the modeling module 202 is configured to build the three-dimensional model of the pool based on the environmental data; if the three-dimensional model of the pool cannot be built, the modeling module 202 is configured to determine, based on the environmental data, supplementary poses for supplementarily collecting environmental data to build the three-dimensional model, prompt the user to collect the environmental data based on the supplementary poses, and build the three-dimensional model based on the environmental data collected by the user and the supplementary-collected environmental data.

In some embodiments, the cleaning module 204 is configured to, in response to receiving an input from an information collection interface of the terminal device, determine characteristic information of the pool, where the characteristic information includes at least one of floor material, wall material or pool depth; and based on the characteristic information, adjust the three-dimensional model.

In some embodiments, the cleaning module 204 is configured to determine cleaning regions corresponding to respective cleaning modes based on the three-dimensional model, where the cleaning regions include pool walls, pool floor, and a combination of the pool wall and the pool floor; for each cleaning mode, based on a cleaning region corresponding to the cleaning mode, plan a candidate path applicable to the cleaning region for the cleaning mode; based on a received cleaning mode selection, determine a candidate path corresponding to the cleaning mode as a cleaning path.

In some embodiments, the cleaning module 204 is configured to determine a start point of the cleaning path as a placement point based on the cleaning path, display the placement point on the display screen of the terminal device to instruct the unmanned cleaning device to move to the placement point.

In some embodiments, the cleaning module 204 is configured to, in response to receiving an input for indicating the unmanned cleaning device to pause working, send a pause instruction to the unmanned cleaning device; display updated guidance information on the display screen of the terminal device, where the updated guidance information is configured to guide the user to re-collect the environmental data of the pool based on re-determined specified poses; build the three-dimensional model of the pool based on the re-collected environmental data; determine an updated cleaning path is determined based on the three-dimensional model, and send a startup instruction including the updated cleaning path to the unmanned cleaning device to instruct the unmanned cleaning device to clean the pool according to the updated cleaning path.

In some embodiments, the cleaning module 204 is configured to receive a cleaning result from the unmanned cleaning device after completion of the cleaning, and display the cleaning result on the display screen of the terminal device, where the cleaning result includes at least one of a ratio of a total cleaning area to a total area of the pool, an overlapping degree of a planned path and an actual cleaning path, a total cleaning area, an average cleaning speed or accumulative cleaning time.

In some embodiments, the cleaning module 204 is configured to, in response to receiving an input for feeding back a cleaning result from the feedback interface, determine a feedback on the working result of the unmanned cleaning device, and based on the cleaning result and the feedback, determine a to-be-recleaned region, and then based on the to-be-recleaned region and the cleaning path, optimize a path planning model for determining the cleaning path with the aim of reducing the area of the to-be-recleaned region.

In some embodiments, the cleaning module 204 is configured to, based on the to-be-recleaned region and the three-dimensional model, determine a second cleaning path, and send the second cleaning path to the unmanned cleaning device to instruct the unmanned cleaning device to clean the pool according to the second cleaning path.

The present disclosure further provides a computer readable storage medium, storing a computer program. The computer program can be configured to perform the method of cleaning a pool provided in FIG. 1.

Figure 22:
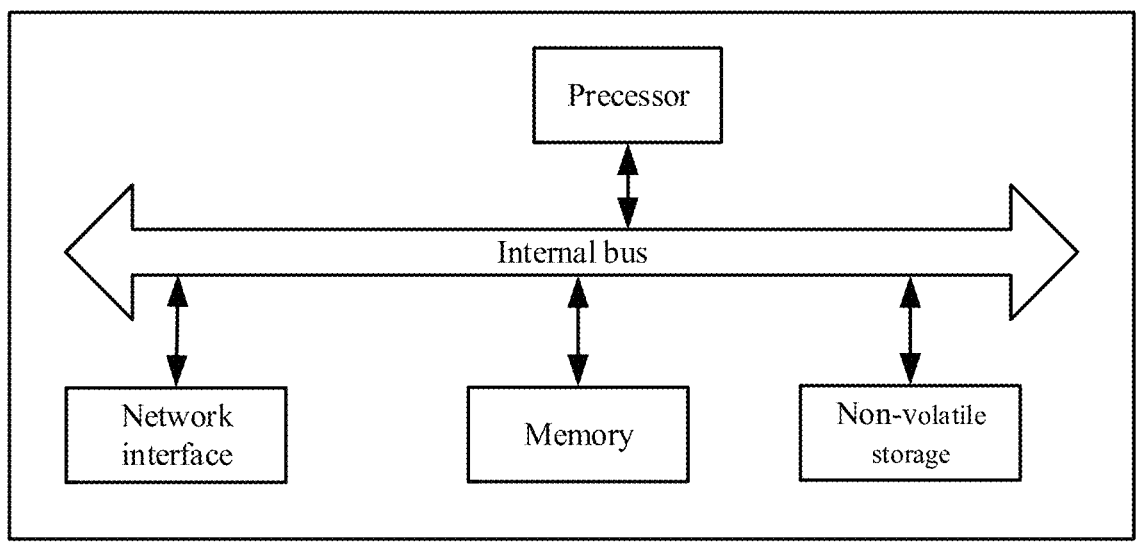
FIG. 22 is a schematic diagram illustrating an electronic device corresponding to the FIG. 1 according to one or more embodiments of the present disclosure.

The present disclosure further provides an electronic device. FIG. 22 is a schematic diagram illustrating the electronic device according to one or more embodiments of the present disclosure. As shown in FIG. 22, from the hardware level, the electronic device includes a processor, an internal bus, a network interface, an internal memory and a non-volatile memory, and can also include hardware required by other services. The processor reads corresponding computer program from the non-volatile memory into the internal memory for running, so as to implement the method of cleaning a pool as shown in FIG. 1. In addition to implementation by software, the present disclosure can also be implemented in another implementation, for example, by logic devices or combination of software and hardware or the like, that is, the execution subject of the above processing flow is not limited to respective logic units and can also be hardware or logic devices.

The systems, devices, modules or units described in the above embodiments can be implemented by computer chips or entities, or by products with certain functions. A typical implementation device is a computer. In some embodiments, the computer can be a personal computer, a laptop computer, a cellular phone, a camera phone, a smart phone, a personal digital assistant, a media player, navigation equipment, an electronic mail transceiver, a game console, a tablet computer, wearable device, or combinations of any devices of these devices.

For ease of descriptions, the above-mentioned apparatus, when described, is divided into various units by function for descriptions. When the present disclosure is implemented, the function of respective units can be implemented in one or more software and/or hardware.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams can be implemented by computer program instructions. These computer program instructions can be provided to a processor of a general-purpose computer, a special-purpose computer, an embedded processor, or other programmable data processing device to produce a machine, so that the instructions executed by the processor of the computer or other programmable data processing device generate an apparatus for implementing functions specified in one or more flows in the flowchart and/or in one or more blocks in the block diagram.

In a typical configuration, a computing device includes one or more central processing units (CPU), an input/output interface, a network interface and a memory.

The memory can include a transitory memory, and a Random Access Memory (RAM) in the computer readable storage medium and/or a non-volatile memory such as Read Only Memory (ROM) or flash RAM. The memory is an example of the computer readable medium.

The computer readable storage medium includes non-transitory, transitory, mobile and non-mobile media, which can realize information storage by any method or technology. The information can be computer readable instructions, data structures, program modules and other data. The examples of the computer storage medium include but not limited to: phase change random access memory (PRAM), a Static Random Access Memory (SRAM), a Dynamic Random Access Memory (DRAM), and Random Access Memory (RAM) with other types, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage or other magnetic storage device or other non-transmission medium for storing information accessible by computing devices. As defined in the present disclosure, the computer readable medium does not include transitory computer readable media such as modulated data signals or carriers.

It is to be noted that the term "including," "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements present in a process, method, product or device including the elements.

It should be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

Different embodiments in the present disclosure are all described in a progressive manner. Each embodiment focuses on the differences from other embodiments with those same or similar parts among the embodiments referred to each other. Particularly, since device embodiments are basically similar to the method embodiments, the device embodiments are briefly described with relevant parts referred to the descriptions of the method embodiments.

The foregoing descriptions are only examples of the present disclosure but not intended to limit the present disclosure. For the persons skilled in the art, various modifications and changes can be made to the present disclosure. Any modifications, equivalent substitutions, and improvements made within the spirit and principles of the disclosure shall be encompassed in the scope of protection of the present disclosure.

The invention claimed is:

1. A method of cleaning a pool, applied to a client application installed in a terminal device, comprising:
   modeling the pool according to information of the pool collected by the terminal device to determine a three-dimensional model of the pool;
   receiving a cleaning result on the pool sent by an unmanned cleaning device coupled with the terminal device, and displaying the cleaning result in the client application, wherein a cleaning path of the unmanned cleaning device is determined by the terminal device according to the three-dimensional model; and
   receiving feedback on the cleaning result, and adjusting a path planning of the unmanned cleaning device based on the feedback;
   wherein modeling the pool according to information of the pool collected by the terminal device to determine the three-dimensional model of the pool comprises:
   in response to receiving an input from a pool shape selection interface of the client application, determining a plurality of collection poses adapted to a shape of the pool;
   according to the plurality of collection poses, collecting the information of the pool by the terminal device, wherein the information comprises images of the pool and laser point cloud data respectively corresponding to the images; and
   according to the images of the pool and laser point cloud data respectively corresponding to the images, modeling the pool to determine the three-dimensional model of the pool.

2. The method of claim 1, wherein in response to receiving the input from the pool shape selection interface of the client application, determining the plurality of collection poses adapted to the shape of the pool comprises:
   based on the shape of the pool, generating a plurality of candidate collection poses;
   determining whether environmental data collected based on the plurality of candidate collection poses is sufficient to build the three-dimensional model of the pool;
   in response to determining that the environmental data collected based on the plurality of candidate collection poses is sufficient to build the three-dimensional model of the pool, determining the plurality of candidate collection poses as the plurality of collection poses; and
   in response to determining that the environmental data collected based on the plurality of candidate collection poses is insufficient to build the three-dimensional model of the pool,
   determining regions failed to be collected by the plurality of candidate collection poses in the pool as uncollected regions;
   for the uncollected regions, determining supplementary poses; and
   determining the supplementary poses and the plurality of candidate collection poses as the plurality of collection poses.

3. The method of claim 1, wherein according to the images of the pool and laser point cloud data respectively corresponding to the images, modeling the pool to determine the three-dimensional model of the pool comprises:
   based on the shape of the pool, displaying an information collection interface in the client application;
   in response to receiving an input from the information collection interface, determining characteristic information of the pool, wherein the characteristic information comprises a pool depth, a pool size, a wall material, and a floor material; and
   based on the characteristic information, the images and the laser point cloud data respectively corresponding to the images, building the three-dimensional model of the pool.

4. The method of claim 1, wherein in response to receiving an input from the pool shape selection interface of the client application, determining the plurality of collection poses adapted to the shape of the pool comprises:
   based on the shape of the pool and a preset step length, determining M candidate collection poses, wherein M is an integer greater than 1, and each of the candidate collection poses comprises a collection position and a collection angle facing toward the pool corresponding to the collection position;

combining M groups of environmental data of the pool collected based on the M candidate collection poses to obtain N sets, wherein N is an integer greater than 1;

selecting one or more sets capable of covering an entire region of the pool from the N sets as one or more candidate sets; and determining candidate collection poses corresponding to a set with a minimum number of groups of environmental data in the one or more candidate sets as the plurality of collection poses.

5. The method of claim 1, wherein according to the images of the pool and laser point cloud data respectively corresponding to the images, modeling the pool to determine the three-dimensional model of the pool comprises:

based on the images and the laser point cloud data respectively corresponding to the images, determining whether the three-dimensional model of the pool is able to be built;

in response to determining that the three-dimensional model of the pool is able to be built, building the three-dimensional model of the pool based on the images and the laser point cloud data respectively corresponding to the images; and in response to determining that the three-dimensional model of the pool is not able to be built, based on the images and the laser point cloud data respectively corresponding to the images, determining supplementary images and supplementary laser point cloud data respectively corresponding to the supplementary images for building the three-dimensional model of the pool, and building the three-dimensional model based on the images and the laser point cloud data respectively corresponding to the images and the supplementary images and supplementary laser point cloud data respectively corresponding to the supplementary images.

6. The method of claim 1, wherein according to the images of the pool and laser point cloud data respectively corresponding to the images, modeling the pool to determine the three-dimensional model of the pool comprises:

based on the images and the laser point cloud data respectively corresponding to the images, determining a first three-dimensional model of the pool;

based on the shape of the pool, displaying an information collection interface in the client application;

in response to receiving an input from the information collection interface, determining characteristic information of the pool, wherein the characteristic information comprises a pool depth, a pool size, a wall material and a floor material;

based on the characteristic information and the shape of the pool, building a second three-dimensional model of the pool; and based on the first three-dimensional model and the second three-dimensional model, modeling the pool to determine the three-dimensional model of the pool.

7. The method of claim 6, wherein based on the first three-dimensional model and the second three-dimensional model, modeling the pool to determine the three-dimensional model of the pool comprises:

gridding the first three-dimensional model to obtain a first grid model and gridding the second three-dimensional model to obtain a second grid model, wherein a unit grid of the first grid model is same as a unit grid of the second grid model;

determining whether a similarity between the first grid model and the second grid model is greater than or equal to a similarity threshold;

in response to determining that the similarity between the first grid model and the second grid model is greater than or equal to the similarity threshold, determining one or more deviation grids between the first grid model and the second grid model;

based on the one or more deviation grids, determining one or more deviation positions;

based on the one or more deviation positions, determining one or more deviation collection poses;

displaying the one or more deviation collection poses in the client application to prompt a user to collect deviation environmental data of the pool based on the one or more deviation collection poses;

based on the deviation environmental data, adjusting the first three-dimensional model; and determining the adjusted first three-dimensional model as the three-dimensional model of the pool.

8. The method of claim 7, wherein determining the similarity between the first grid model and the second grid model comprises:

determining one grid model with a maximum number of grids in the first grid model and the second grid model as a reference grid model; and determining a ratio of a number of grids of a grid model other than the reference grid model in the first grid model and the second grid model to a number of grids of the reference grid model as the similarity.

9. The method of claim 6, wherein based on the first three-dimensional model and the second three-dimensional model, modeling the pool to determine the three-dimensional model of the pool comprises:

gridding the first three-dimensional model to obtain a first grid model and gridding the second three-dimensional model to obtain a second grid model, wherein a unit grid of the first grid model is same as a unit grid of the second grid model;

determining whether a similarity between the first grid model and the second grid model is greater than or equal to a similarity threshold;

in response to determining that the similarity between the first grid model and the second grid model is greater than or equal to the similarity threshold, determining one or more deviation grids between the first grid model and the second grid model;

based on the one or more deviation grids, determining one or more deviation positions; and in response to determining that the one or more deviation positions correspond to positions of the pool size in the characteristic information, determining that the one or more deviation positions are associated with the characteristic information of the pool, and determining the three-dimensional model of the pool based on the second three-dimensional model.

10. The method of claim 1, wherein receiving the cleaning result on the pool sent by the unmanned cleaning device, and displaying the cleaning result in the client application, comprises:

generating a cleaning path of the unmanned cleaning device based on the three-dimensional model of the pool;

sending the cleaning path to the unmanned cleaning device; and receiving and displaying the cleaning result of the unmanned cleaning device in the client application after the unmanned cleaning device finishes cleaning the pool according to the cleaning path.

11. The method of claim 1, wherein receiving the cleaning result on the pool sent by the unmanned cleaning device, and displaying the cleaning result in the client application, comprises:
sending the three-dimensional model of the pool and an identifier of the unmanned cleaning device to a server associated with the client application; and
receiving and displaying the cleaning result in the client application sent by the unmanned cleaning device via the server after the unmanned cleaning device finishes cleaning the pool according to the cleaning path.

12. The method of claim 1, further comprising:
providing a plurality of cleaning modes in the client application, wherein the plurality of cleaning modes correspond to a plurality of cleaning regions respectively, and the plurality of cleaning regions comprises: a pool wall, a pool floor, and a combination of the pool wall and the pool floor; and
for a selected cleaning mode from the plurality of cleaning modes, based on the cleaning region corresponding to the selected cleaning mode, planning a candidate path suitable for the cleaning region corresponding to the selected cleaning mode, and determining the candidate path as the cleaning path of the unmanned cleaning device in the pool.

13. The method of claim 1, wherein receiving feedback on the cleaning result and adjusting the path planning of the unmanned cleaning device based on the feedback comprises:
receiving one or more cleaning images collected by the unmanned cleaning device during a process of cleaning the pool;
based on the one or more cleaning images, determining a cleaning image corresponding to a to-be-recleaned region as a labeled image; and
sending the labeled image to the unmanned cleaning device to instruct the unmanned cleaning device to perform second cleaning for a region corresponding to the labeled image in a next process of cleaning the pool.

14. The method of claim 1, wherein receiving feedback on the cleaning result and adjusting the path planning of the unmanned cleaning device based on the feedback comprises:
in response to receiving feedback on the cleaning result from a feedback interface of the client application, determining a to-be-recleaned region of the pool; and
adjusting the path planning of the unmanned cleaning device based on the to-be-recleaned region of the pool, such that the unmanned cleaning device repeatedly cleans the to-be-recleaned region of the pool according to the adjusted path planning.

15. The method of claim 14, wherein in response to receiving the feedback on the cleaning result from the feedback interface of the client application, determining the to-be-recleaned region of the pool comprises at least one of:
displaying cleaning regions of the pool in the feedback interface of the client application, wherein the cleaning regions of the pool are divided into a plurality of sub-regions, and one or more of the sub-regions are marked as the to-be-recleaned regions;
displaying the three-dimensional model of the pool in the feedback interface of the client application, wherein the to-be-recleaned regions are marked in the three-dimensional model by closed graphics, line segments or points; or
displaying to-be-recleaned region options of the pool in the feedback interface of the client application, wherein the to-be-recleaned region options comprises: east wall is not cleaned, west wall is not cleaned, north wall is not cleaned, south wall is not cleaned, or pool floor is not cleaned.

16. The method of claim 1, wherein the cleaning result comprises at least one of:
a ratio of a total cleaning region to a total region of the pool;
an overlapping degree between a planned path and an actual cleaning path of the unmanned cleaning device;
a total cleaning area of the unmanned cleaning device;
an average cleaning speed of the unmanned cleaning device;
a maximum cleaning speed of the unmanned cleaning device;
a cleaning time of the unmanned cleaning device;
an actual cleaning path of the unmanned cleaning device;
an estimated cleaning time of the unmanned cleaning device;
a difference between an estimated cleaning time and an accumulated running time of the unmanned cleaning equipment; or
an accumulated cleaning time of the unmanned cleaning device.

17. An electronic device, comprising a memory, a processor and a computer program stored on the memory and run on the processor, wherein the processor executes the program to perform the method according to claim 1.

18. A method of cleaning a pool, applied to a client application installed in a terminal device, comprising:
modeling the pool according to information of the pool collected by the terminal device to determine a three-dimensional model of the pool;
receiving a cleaning result on the pool sent by an unmanned cleaning device coupled with the terminal device, and displaying the cleaning result in the client application, wherein a cleaning path of the unmanned cleaning device is determined by the terminal device according to the three-dimensional model; and
receiving feedback on the cleaning result, and adjusting a path planning of the unmanned cleaning device based on the feedback;
wherein the method further comprising:
in response to receiving an input for indicating the unmanned cleaning device to pause working, sending a pause instruction to the unmanned cleaning device;
displaying guidance information in the client application, wherein the guidance information is configured to guide a user to collect environmental data of the pool based on re-determined collection poses;
based on the environmental data, building a third three-dimensional model of the pool;
based on the third three-dimensional model, determining an updated cleaning path of the unmanned cleaning device in the pool;
sending a startup instruction comprising the updated cleaning path to the unmanned cleaning device to instruct the unmanned cleaning device to perform cleaning according to the updated cleaning path; and
receiving an updated cleaning result of the unmanned cleaning device after cleaning according to the updated cleaning path and display the updated cleaning result in the client application.

19. A non-transitory computer readable storage medium, storing a computer program, wherein the computer program is executed by a processor to perform operations comprising:
- modeling a pool according to information of the pool collected by a terminal device to determine a three-dimensional model of the pool;
- receiving a cleaning result on the pool sent by an unmanned cleaning device coupled with the terminal device, and displaying the cleaning result in a client application, wherein a cleaning path of the unmanned cleaning device is determined by the terminal device according to the three-dimensional model; and
- receiving feedback on the cleaning result, and adjusting a path planning of the unmanned cleaning device based on the feedback;
- wherein modeling the pool according to information of the pool collected by the terminal device to determine the three-dimensional model of the pool comprises:
  - in response to receiving an input from a pool shape selection interface of the client application, determining a plurality of collection poses adapted to a shape of the pool;
  - according to the plurality of collection poses, collecting the information of the pool by the terminal device, wherein the information comprises images of the pool and laser point cloud data respectively corresponding to the images; and
  - according to the images of the pool and laser point cloud data respectively corresponding to the images, modeling the pool to determine the three-dimensional model of the pool.

* * * * *